US009286810B2

(12) United States Patent
Eade et al.

(10) Patent No.: US 9,286,810 B2
(45) Date of Patent: Mar. 15, 2016

(54) SYSTEMS AND METHODS FOR VSLAM OPTIMIZATION

(75) Inventors: Ethan Eade, Seattle, WA (US); Mario E. Munich, Sierra Madre, CA (US); Philip Fong, Pasadena, CA (US)

(73) Assignee: iRobot Corporation, Bedford, MA (US)

(*) Notice: Subject to any disclaimer, the term of this patent is extended or adjusted under 35 U.S.C. 154(b) by 1192 days.

(21) Appl. No.: 13/244,221

(22) Filed: Sep. 23, 2011

(65) Prior Publication Data

US 2012/0121161 A1    May 17, 2012

Related U.S. Application Data

(60) Provisional application No. 61/404,001, filed on Sep. 24, 2010.

(51) Int. Cl.
*G09B 29/00* (2006.01)
(52) U.S. Cl.
CPC .................................. *G09B 29/007* (2013.01)
(58) Field of Classification Search
None
See application file for complete search history.

(56) References Cited

U.S. PATENT DOCUMENTS

| | | | |
|---|---|---|---|
| 4,628,453 A | 12/1986 | Kamejima et al. |
| 4,846,297 A | 7/1989 | Field |
| 4,942,539 A | 7/1990 | McGee |
| 4,954,962 A | 9/1990 | Evans et al. |
| 5,040,116 A | 8/1991 | Evans et al. |
| 5,083,257 A | 1/1992 | Kennedy |
| 5,109,425 A | 4/1992 | Lawton |
| 5,111,401 A | 5/1992 | Everett et al. |
| 5,144,685 A * | 9/1992 | Nasar .................. G05D 1/0246 348/119 |
| 5,155,775 A | 10/1992 | Brown |

(Continued)

FOREIGN PATENT DOCUMENTS

| | | |
|---|---|---|
| EP | 0390052 A2 | 10/1990 |
| JP | 2006-184976 | 7/2006 |

(Continued)

OTHER PUBLICATIONS

Thrun, Sebastian, and Yufeng Liu. "Multi-robot SLAM with sparse extended information filers." Robotics Research. Springer Berlin Heidelberg, 2005. 254-266.*

(Continued)

*Primary Examiner* — Aaron W Carter
(74) *Attorney, Agent, or Firm* — KPPB LLP

(57) ABSTRACT

The invention is related to methods and apparatus that use a visual sensor and dead reckoning sensors to process Simultaneous Localization and Mapping (SLAM). These techniques can be used in robot navigation. Advantageously, such visual techniques can be used to autonomously generate and update a map. Unlike with laser rangefinders, the visual techniques are economically practical in a wide range of applications and can be used in relatively dynamic environments, such as environments in which people move. Certain embodiments contemplate improvements to the front-end processing in a SLAM-based system. Particularly, certain of these embodiments contemplate a novel landmark matching process. Certain of these embodiments also contemplate a novel landmark creation process. Certain embodiments contemplate improvements to the back-end processing in a SLAM-based system. Particularly, certain of these embodiments contemplate algorithms for modifying the SLAM graph in real-time to achieve a more efficient structure.

18 Claims, 19 Drawing Sheets

(56) References Cited

U.S. PATENT DOCUMENTS

| | | |
|---|---|---|
| 5,170,352 A | 12/1992 | McTamaney et al. |
| 5,321,614 A | 6/1994 | Ashworth |
| 5,517,419 A | 5/1996 | Lanckton et al. |
| 5,525,882 A | 6/1996 | Asaka et al. |
| 5,525,883 A | 6/1996 | Avitzour |
| 5,581,629 A | 12/1996 | Hanna et al. |
| 5,677,836 A | 10/1997 | Bauer |
| 5,793,934 A | 8/1998 | Bauer |
| 5,911,767 A | 6/1999 | Garibotto et al. |
| 5,957,984 A | 9/1999 | Rencken |
| 5,961,571 A | 10/1999 | Gorr et al. |
| 6,005,610 A | 12/1999 | Pingali |
| 6,009,359 A | 12/1999 | El-Hakim et al. |
| 6,108,597 A | 8/2000 | Kirchner et al. |
| 6,243,657 B1 | 6/2001 | Tuck et al. |
| 6,256,581 B1 | 7/2001 | Fujii et al. |
| 6,266,068 B1 | 7/2001 | Kang et al. |
| 6,269,763 B1 | 8/2001 | Woodland |
| 6,285,393 B1 | 9/2001 | Shimoura et al. |
| 6,288,704 B1 | 9/2001 | Flack et al. |
| 6,301,370 B1 | 10/2001 | Steffens et al. |
| 6,330,858 B1 | 12/2001 | McDonough et al. |
| 6,427,118 B1 | 7/2002 | Suzuki |
| 6,453,223 B1 | 9/2002 | Kelly et al. |
| 6,459,955 B1 | 10/2002 | Bartsch et al. |
| 6,496,754 B2 | 12/2002 | Song et al. |
| 6,516,267 B1 | 2/2003 | Cherveny et al. |
| 6,552,729 B1 | 4/2003 | Di Bernardo et al. |
| 6,687,571 B1 | 2/2004 | Byrne et al. |
| 6,711,293 B1 | 3/2004 | Lowe |
| 6,728,635 B2 | 4/2004 | Hamada et al. |
| 6,766,245 B2 | 7/2004 | Padmanabhan |
| 6,771,932 B2 | 8/2004 | Caminiti et al. |
| 6,836,701 B2 | 12/2004 | McKee |
| 6,856,901 B2 | 2/2005 | Jan |
| 6,898,518 B2 | 5/2005 | Padmanabhan |
| 6,904,360 B2 | 6/2005 | Pechatnikov et al. |
| 6,915,008 B2 | 7/2005 | Barman et al. |
| 6,917,855 B2 | 7/2005 | Gonzalez-Banos et al. |
| 6,922,632 B2 | 7/2005 | Foxlin |
| 7,015,831 B2 | 3/2006 | Karlsson et al. |
| 7,031,496 B2 | 4/2006 | Shimano et al. |
| 7,082,350 B2 | 7/2006 | Skoog |
| 7,135,992 B2 | 11/2006 | Karlsson et al. |
| 7,145,478 B2 | 12/2006 | Goncalves et al. |
| 7,162,338 B2 | 1/2007 | Goncalves et al. |
| 7,177,737 B2 | 2/2007 | Karlsson et al. |
| 7,272,467 B2 | 9/2007 | Goncalves et al. |
| 7,573,403 B2 | 8/2009 | Goncalves et al. |
| 7,679,532 B2 | 3/2010 | Karlsson et al. |
| 7,689,321 B2 | 3/2010 | Karlsson et al. |
| 7,774,158 B2* | 8/2010 | Domingues Goncalves ........... G01C 21/12 701/26 |
| 8,086,419 B2 | 12/2011 | Goncalves et al. |
| 8,095,336 B2 | 1/2012 | Goncalves et al. |
| 8,649,565 B1* | 2/2014 | Kim ................... G06K 9/00369 382/106 |
| 8,849,036 B2* | 9/2014 | Shin .................... G05D 1/0246 382/153 |
| 9,031,809 B1* | 5/2015 | Kumar ................ G01C 21/165 702/150 |
| 2002/0072848 A1 | 6/2002 | Hamada et al. |
| 2002/0095239 A1 | 7/2002 | Wallach et al. |
| 2003/0007682 A1 | 1/2003 | Koshizen et al. |
| 2003/0025472 A1 | 2/2003 | Jones et al. |
| 2003/0030398 A1 | 2/2003 | Jacobs et al. |
| 2003/0044048 A1 | 3/2003 | Zhang |
| 2004/0167667 A1* | 8/2004 | Goncalves ............ G01C 21/12 700/245 |
| 2004/0167669 A1 | 8/2004 | Karlsson et al. |
| 2004/0167670 A1 | 8/2004 | Goncalves et al. |
| 2004/0167688 A1 | 8/2004 | Karlsson et al. |
| 2004/0167716 A1 | 8/2004 | Goncalves et al. |
| 2004/0168148 A1 | 8/2004 | Goncalves et al. |
| 2005/0159879 A1* | 7/2005 | De Graeve ........ G06F 17/30241 706/20 |
| 2005/0182518 A1* | 8/2005 | Karlsson ............. G05D 1/0246 700/253 |
| 2005/0223176 A1* | 10/2005 | Peters, II ................. B25J 13/00 711/141 |
| 2005/0234679 A1* | 10/2005 | Karlsson ............. G05D 1/0272 702/181 |
| 2005/0238200 A1* | 10/2005 | Gupta ................ G06K 9/00201 382/103 |
| 2005/0289527 A1 | 12/2005 | Illowsky et al. |
| 2006/0012493 A1 | 1/2006 | Karlsson et al. |
| 2006/0095169 A1 | 5/2006 | Minor et al. |
| 2007/0045018 A1 | 3/2007 | Carter et al. |
| 2007/0090973 A1 | 4/2007 | Karlsson et al. |
| 2007/0097832 A1 | 5/2007 | Koivisto et al. |
| 2007/0262884 A1* | 11/2007 | Goncalves et al. ....... 340/995.24 |
| 2008/0009965 A1 | 1/2008 | Bruemmer et al. |
| 2008/0033645 A1* | 2/2008 | Levinson ............... G01C 15/00 701/469 |
| 2008/0065267 A1* | 3/2008 | Hong ..................... B25J 9/0003 700/245 |
| 2008/0133052 A1 | 6/2008 | Jones et al. |
| 2009/0276092 A1* | 11/2009 | Yoon ..................... B25J 9/1666 700/245 |
| 2010/0274387 A1* | 10/2010 | Pitzer .................... G06N 7/005 700/246 |
| 2010/0280754 A1 | 11/2010 | Goncalves et al. |
| 2010/0284621 A1 | 11/2010 | Goncalves et al. |
| 2010/0286905 A1 | 11/2010 | Goncalves et al. |
| 2011/0125323 A1 | 5/2011 | Gutmann et al. |
| 2012/0089295 A1* | 4/2012 | Ahn ..................... G05D 1/0242 701/28 |
| 2012/0121161 A1* | 5/2012 | Eade .................... G09B 29/007 382/153 |
| 2013/0006420 A1* | 1/2013 | Karlsson ................ G01C 21/12 700/253 |
| 2013/0138246 A1* | 5/2013 | Gutmann ............. G05D 1/0231 700/253 |

FOREIGN PATENT DOCUMENTS

| | | | |
|---|---|---|---|
| JP | 2012-64131 | 3/2012 | |
| WO | WO 2007051972 A1 * | 5/2007 | .............. G01C 21/00 |

OTHER PUBLICATIONS

Karlsson, Niklas, et al. "The vSLAM algorithm for robust localization and mapping." Robotics and Automation, 2005. ICRA 2005. Proceedings of the 2005 IEEE International Conference on. IEEE, 2005.*

Ila, V.; Andrade-Cetto, J.; Valencia, R.; Sanfeliu, Alberto, "Vision-based loop closing for delayed state robot mapping," Intelligent Robots and Systems, 2007. IROS 2007. IEEE/RSJ International Conference on , vol., no., pp. 3892,3897, Oct. 29, 2007-Nov. 2, 2007.*

Jens-Steffen Gutmann, Gabriel Brisson, Ethan Eade, Philip Fong, Mario E. Munich, "Vector field SLAM," ICRA, 236-242, May 2010.*

Jens-Steffen Gutmann, Ethan Eade, Philip Fong, Mario E. Munich, "A Constant-Time Algorithm for Vector Field SLAM using an Exactly Sparse Extended Information Filter" Robotics: Science and Systems, Jun. 2010.*

Hahnel, Dirk, et al. "An efficient FastSLAM algorithm for generating maps of large-scale cyclic environments from raw laser range measurements." Intelligent Robots and Systems, 2003.(IROS 2003). Proceedings. 2003 IEEE/RSJ International Conference on. vol. 1. IEEE, 2003.*

Eade et al., "Monocular Graph SLAM with Complexity Reduction", IEEE, Oct. 2010.*

Australian Government IP Australia; Patent Examination Report dated Oct. 23, 2013, from related Australian Patent Application No. 2011305154.

Adam et al.; Fusion of Fixation and Odometry for Vehicle Navigation; (1999); IEEE; 29(6): 593-603.

Agrawal et al., CenSurE: Center Surround Extremas for Realtime Feature Detection and Matching, Lecture Notes in Computer Science, Computer Vision—ECCV (2008), 5305: 102-115.

(56) References Cited

OTHER PUBLICATIONS

Bay et al., Speeded-up Robust Features (SURF). Computer Vision and Image Understanding, (2008), 110(3) : 346-359 [Available Online Dec. 15, 2007].
Castellanos et al., Multisensor Fusion for Simultaneous Localization and Map Building; (2001); IEEE; 17(6): 908-914.
Castle et al., Video-rate localization in multiple maps for wearable augmented reality. In Proc 12th IEEE Int Symp on Wearable Computers (2008), Pittsburgh PA, Sep. 28-Oct. 1, 2008, pp. 15-22.
Davison et al., Monoslam: Real-time single camera slam. IEEE Trans. Pattern Anal. Mach. Intell., (2007), 29(6): 1052-1067.
Davison., Real-time simultaneous localisation and mapping with a single camera. In Proc. 9th IEEE International Conference on Computer Vision (ICCV'03), Nice, France, (Oct. 2003), pp. 1403-1410.
Digiclops, versatile digital camera [online], [retrieved on Sep. 23, 2003]. Point Grey Research. Retrieved from the Internet: <URL: http://www.ptgrey.com/products/digiclops/digiclops.pdf>.
Dissanayake et al., a Computationally Efficient Solution to the Simultaneous Localisation and Map Building (SLAM) Problem, Proceedings of the 2000 IEEE international Conference on Robotics & Automation (ICRA) (Apr. 2000), pp. 1009-1014.
Eade et al., Monocular SLAM as a graph of coalesced observations. In Proc.11th IEEE International Conference on Computer Vision (ICCV'07), Rio de Janeiro, Brazil, (Oct. 2007), pp. 1-8.
Eade et al., Unified Loop Closing and Recovery for Real Time Monocular Slam. In Proc. British Machine Vision Conference (BMVC '08), Leeds, BMVA, (Sep. 2008), pp. 53-62.
Faugeras et al., Three Views: The trifocal geometry in The Geometry of Multiple Images, (Cambridge, The MIT Press, 2001), Chapter 8, pp. 409-500.
Fischler et al., Random sample consensus: A paradigm for model fitting with applications to image analysis and automated cartography. Communications of the ACM, (Jun. 1981), 24(6): 381-395.
Fox et al., Particle Filters for Mobile Robot Localization in: Doucet, A., Freitas, N., and Gordon, N., Sequential Monte Carlo Methods in Practice (New York, Springer Verlag, 2001), pp. 401-428.
Fox et al., Markov Localization for mobile robots in dynamic environments Journal of Artificial Intelligence Research , vol. 11 (1999), pp. 391-427.
Gaspar et al.; Vision-Based Navigation and Environmental Representation with an Omnidirectional Camera; IEEE, (2000), 16(6): 890-898.
Goncalves et al., A visual frontend for simultaneous localization and mapping. In Proc. of Int. Conf. on Robotics and Automation (ICRA), Barcelona, Spain, (Apr. 2005), pp. 44-49.
Grisetti et al., Online Constraint Network Optimization for Efficient Maximum Likelihood Map Learning. Robotics and Automation IEEE Conference (ICRA), Pasadena, California, (May 2008), pp. 1880-1885.
Ila et al., Vision-based Loop Closing for Delayed State Robot Mapping, Proceedings of the 2007 IEEE/RSJ International, San Diego, CA (Oct. 2007), pp. 3892-3897.
Kalman R.E., A New Approach to Linear Filtering and Prediction Problems Transactions of the ASME—Journal of Basic Engineering, (1960), vol. 82D, pp. 35-45 & Appendix.
Karlsson et al., The vSLAM Algorithm for Robust Localization and Mapping, Proc of Int Conf on Robotics & Automation (ICRA), (2005) [Online: http://ieeexplore.ieee.org/xpl/freeabs_all.jsp?arnumber=1570091].
Klein et al., Parallel tracking and mapping for small AR workspaces. In Proc. 6thh IEEE and ACM Int'l Symp. Mixed and Augmented Reality, (2007) pp. 1-10.
Konolige et al., Frame-frame matching for realtime consistent visual mapping. In Proc. 2007 IEEE International Conference on Robotics and Automation (ICRA '07), Rome, Italy, (Apr. 2007) pp. 2803-2810.
Konolige, K., SLAM via Variable Reduction from Constraint Maps. Proceedings of the 2005 IEEE International Conference, Barcelona, Spain, in ICRA, Robotics and Automation (Apr. 2005) pp. 667-672.
Konolige, K., View-based maps. In Proceedings of Robotics: Science and Systems, Seattle, USA, (Jun. 2009), pp. 1-14.
Kretzschmar et al., Lifelong Map Learning for Graph-based SLAM in Static Environments. KI—Künstliche Intelligenz, (May 2010) 24(3), 199-206.
Lowe D. G., Distinctive image features from scale-invariant keypoints. International Journal of Computer Vision, (2004), 60(2): 91-100.
Lowe, D.G., Local Feature View Clustering for 3D Object Recognition, Proceedings of the IEEE Conference on Computer Vision and Pattern Recognition, Kauai, Hawaii (Dec. 2001), pp. 1-7.
Lowe, D. G., Object Recognition from Local Scale-Invariant Features, Proceedings of the International Conference on Computer Vision, Corfu, Greece (Sep. 1999), pp. 1-8.
Matas et al., Robust wide baseline stereo from maximally stable extremal regions. In Proc. British Machine Vision Conference (BMVC '02) , Cardiff, (Sep. 2002) pp. 384-393.
Mikolajcyk et al., A performance evaluation of local descriptors. IEEE Transactions on Pattern Analysis and Machine Intelligence (PAMI), (2005), 27(10): 1615-1630.
Montemerlo et al., FastSLAM 2.0: An Improved Particle Filtering Algorithm for Simultaneous Localization and Mapping that Provably Converges., Proc. 18th International Joint Conference on Artificial Intelligence (IJCAI'03), Acapulco, Mexico, (Aug. 2003) pp. 1-6.
Montemerlo et al., FastSLAM: A Factored Solution to the Simultaneous Localization and Mapping Problem, Proceedings of the American Association for Artificial Intelligence (AAAI) National Conference on Artificial Intelligence, Edmonton, Canada (2002), pp. 1-6.
Nister et al., Scalable recognition with a vocabulary tree. In Proc. IEEE Intl. Conference on Computer Vision and Pattern Recognition (CVPR '06), pp. 2161-2168, New York, NY, USA, . IEEE Computer Society (Jun. 2006), pp. 2161-2168.
Nister, D., An Efficient Solution to the Five-Point Relative Pose Problem. IEEE Trans Pattern Anal Mach Intel!. (PAMI), (Jun. 2004), 26(6): 756-777.
Roumeliotis et al., Bayesian estimation and Kalman filtering: A unified framework for mobile robot localization Proceedings of the IEEE International Conference on Robotics and Automation (ICRA), San Francisco, CA (2000) pp. 2985-2992.
Se et al., Local and Global Localization for Mobile Robots using Visual Landmarks Proceedings of the 2001 IEEE/RSJ International Conference on Intelligent Robots and Systems, Maui, Hawaii, (2001) pp. 414-420.
Se et al., Mobile Robot Localization and Mapping with Uncertainty using Scale-Invariant Visual Landmarks the International Journal of Robotics Research, vol. 21, No. 8, (Sage Publications Aug. 2002), pp. 735-758.
Se et al., Vision-based Mobile Robot Localization and Mapping using Scale-Invariant Features Proceedings of IEEE International Conference on Robotics and Automation, Seoul, Korea, May 2001 (ICRA 2001), pp. 2051-2058.
Shewchuk, J. R., An Introduction to the Conjugate Gradient Method without the agonizing pain. Technical report, Pittsburgh, PA, USA, (1994) pp. 1-64.
Sivic et al., Video Google: A text retrieval approach to object matching in videos. In Proc. 9th IEEE International Conference on Computer Vision (ICCV'03), Nice, France, (Oct. 2003), pp. 1470-1477.
Stella et al., Position Estimation for a Mobile Robot using Data Fusion. Intelligent Control, IEEE, May, 1995, pp. 565-570.
Thrun et al., The GraphSLAM Algorithm with Applications to Large-scale Mapping of Urban Structures. International Journal of on Robotics Research, (2005) 25(5/6): 403-430.
Thrun et al., A Probabilistic Approach to Concurrent Mapping and Localization for Mobile Robots Machine Learning & Autonomous Robots, (1998) 31(5): 1-25.
Thrun et al., Multi-Robot SLAM With Sparce Extended Information Filers, Robotics Research, Springer Tracts in Advanced Robotics, (2005) 15: 1-12. [Online: http://springerlink.com/content/255jw4lnhhwq6k1l].

(56) References Cited

OTHER PUBLICATIONS

Thrun, S. Probabilistic Algorithms in Robotics, Technical Report, CMU-CS-00-126, Carnegie Mellon University, Pittsburgh, PA, (Apr. 2000), pp. 1-18.

Thrun, S. Robotic Mapping: A Survey, Technical Report, CMU-CS-02-111, Carnegie Mellon University, Pittsburgh, PA (Feb. 2000) pp. 1-29.

Triggs et al., Bundle adjustment—A Modern Synthesis. In B. Triggs, A. Zisserman, and R. Szeliski, editors, Vision Algorithms: Theory and Practice, Lecture Notes in Computer Science, (2000) 1883: 298-372.

Williams et al., An image-to-map loop closing method for monocular slam. In Proc. 2007 IEEE Int. Conf. Intelligent Robots and Systems, (2008) pp. 1-7.

Wolf et al., Robust Vision-based Localization for Mobile Robots Using an Image Retrieval System Based on Invariant Features Proceedings of the 2002 IEEE International Conference on Robotics and Automation, Washington, DC, (May 2002) pp. 359-363.

International Search Report and Written Opinion dated Jan. 19, 2012 for PCT application PCT/US2011/053122, filed Sep. 23, 2011.

Japanese Patent Office; Notice of Reasons for Rejection dated Mar. 3, 2014, from related Japanese Patent Application No. 2013-530375.

\* cited by examiner

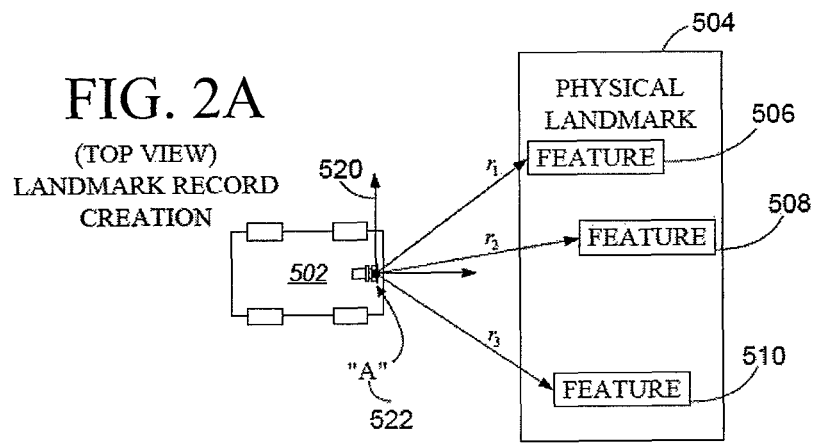
FIG. 2A
(TOP VIEW)
LANDMARK RECORD CREATION
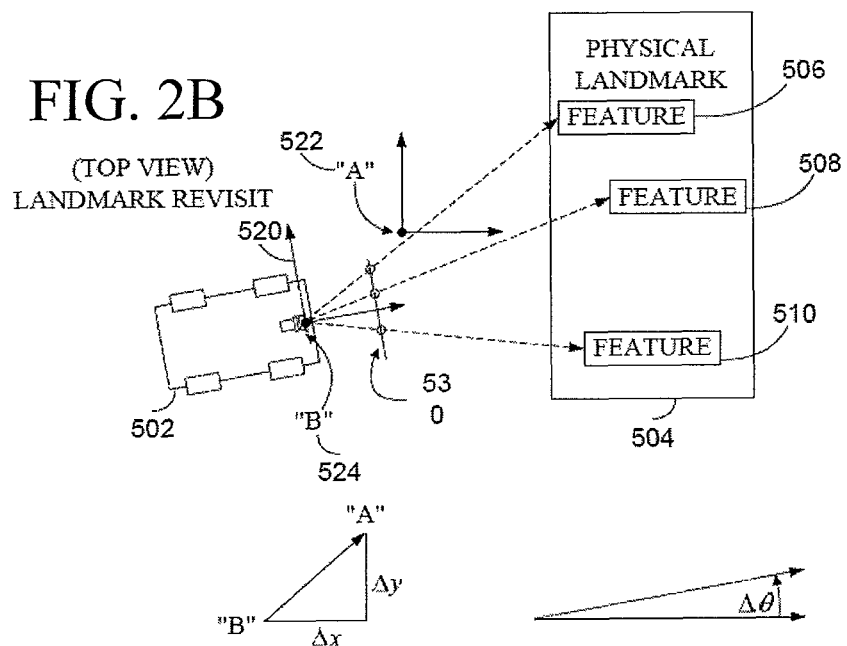
FIG. 2B
(TOP VIEW)
LANDMARK REVISIT
FIG. 2C
FIG. 2D

VISUAL FRONT END LANDMARK CREATION

SYSTEMS AND METHODS FOR VSLAM OPTIMIZATION

CROSS-REFERENCE TO RELATED APPLICATIONS

This application claims priority to Provisional Application 61/404,001 filed on Sep. 24, 2010, the disclosure of which is hereby incorporated by reference in its entirety herein. This application is further related to issued U.S. Pat. No. 7,774,158, filed Dec. 17, 2003 titled SYSTEMS AND METHODS FOR LANDMARK GENERATION FOR VISUAL SIMULTANEOUS LOCALIZATION AND MAPPING, the disclosure of which is hereby incorporated by reference in its entirety herein.

TECHNICAL FIELD

The invention generally relates to navigation of mobile electronic devices. In particular, the invention relates to front-end and back-end processing for localization and mapping techniques that can be used in mobile electronic systems, such as in mobile robots.

BACKGROUND OF THE INVENTION

Mobile robots are becoming more and more commonplace in society. It will be understood that these robots can be embodied in a variety of forms, such as in automated vacuum cleaners. A variety of applications can be found for mobile robots, such as, but not limited to, entertainment applications, such as toy robots, utility applications in environments that are unfriendly to humans, such as space, deep water, cold temperature, radiation, chemical exposure, biohazards, etc., dangerous tasks such as defusing of potential explosives, operation in confined spaces, such as collapsed buildings, the performance of menial tasks, such as cleaning, etc. Conventional robots that are mobile do not include automated localization and/or mapping functionality.

Localization techniques refer to processes by which a robot determines its position with respect to its surroundings. For example, in a "pure" localization system, the robot is provided with a map of its surroundings. Such "pure" localization systems are disadvantageous because generating a map via manual techniques is a relatively difficult, labor-intensive, and specialized task. Moreover, many environments are not static. For example, the rearranging of furniture in a room can render a preexisting map unusable. As a result, maps in pure localization systems are subject to relatively frequent and costly updates such that the map accurately represents its surroundings. This may be especially true for unmanned air, water, and ground vehicles.

Mapping techniques relate to processes by which a robot builds a map of its surroundings. A robot that can autonomously build a map of its surroundings and can localize itself within the map can advantageously exhibit a relatively high degree of autonomy. Moreover, such a robot can advantageously adapt to changes in its surroundings. This process of building a map and using the generated map is known as Simultaneous Localization and Mapping (SLAM). It will be understood that while SLAM relates to the building of a map (mapping) and the use of the map (localizing), a process associated with localization and a process associated with mapping need not actually be performed simultaneously for a system to perform SLAM. For example, procedures can be performed in a multiplexed fashion. Rather, it is sufficient that a system is capable of both localization and mapping in order to perform SLAM. For example, a SLAM system can use the same data to both localize a vehicle, such as a mobile robot, or a smart phone, within a map and also to update the map.

SLAM processes typically use probabilistic techniques, such as Bayesian Estimation. Various states of a dynamic system, such as various hypotheses of a location of a robot and/or a map of robot, can be simultaneously maintained. With probabilistic techniques, a probability density function represents the distribution of probability over these various states of the system. The probability density function can be approximated with a finite number of sample points, termed "particles" or in parametric form (for example using a mean vector and a covariance matrix to represent a Gaussian probability distribution).

Conventional SLAM techniques exhibit relatively many disadvantages. For example, one conventional SLAM technique builds a map using a laser rangefinder. Such laser rangefinder techniques, while accurate, are relatively unreliable in dynamic environments such as environments where people are walking. In addition, a laser rangefinder is a relatively expensive instrument, and can be cost prohibitive for many robot applications. The following references provide a general overview of previous systems and components.

REFERENCES

[1] M. Agrawal and K. Konolige. Censure: Center surround extremas for realtime feature detection and matching. In ECCV, 2008.

[2] Herbert Bay, Andreas Ess, Tinne Tuytelaars, and Luc Van Gool. Speeded-up robust features (surf). *Computer Vision and Image Understanding*, 110(3):346-359, 2008.

[3] R. O. Castle, G. Klein, and D. W. Murray. Video-rate localization in multiple maps for wearable augmented reality. In *Proc 12th IEEE Int Symp on Wearable Computers*, Pittsburgh Pa., Sep. 28-Oct. 1, 2008, pages 15-22, 2008.

[4] A. Davison, 1. Reid, N. Molton, and O. Stasse. Monoslam: Real-time single camera slam. *IEEE Trans. Pattern Anal. Mach. Intell.*, 29(6):1052-1067, 2007.

[5] Andrew J. Davison. Real-time simultaneous localisation and mapping with a single camera. *In Proc. 9th IEEE International Conference on Computer Vision (ICCV'03)*, pages 1403-1410, Nice, France, October 2003.

[6] E. Eade and T. Drummond. Monocular slam as a graph of coalesced observations. In *Proc. 11th IEEE International Conference on Computer Vision (ICCV'07)*, Rio de Janeiro, Brazil, October 2007.

[7] E. Eade and T. Drummond. Unified loop closing and recovery for real time monocular slam. In *Proc. British Machine Vision Conference (BM VC '08)*, pages 53-62, Leeds, September 2008. BMVA.

[8] M. A. Fischler and R. C. Bolles. Random sample consensus: A paradigm for model fitting with applications to image analysis and automated cartography. *Communications of the ACM*, 24(6):381-395, June 1981.

[9] L. Goncalves, E. Di Bernardo, D. Benson, M. Svedman, J. Ostrowski, N. Karlsson, and P. Pirjanian. A visual frontend for simultaneous localization and mapping. In *Proc. of Int. Conf on Robotics and Automation (ICRA)*, 2005.

[10] Giorgio Grisetti, Dario Lodi Rizzini, Cyrill Stachniss, Edwin Olson, and Wolfram Burgard. Online constraint network optimization for efficient maximum likelihood map learning. In *ICRA*, pages 1880-1885, Pasadena, Calif., April 2008.

[11] N. Karlsson, E. di Bernardo, J. Ostrowski, L. Goncalves, P. Pirjanian, and M. E. Munich. The vslam algorithm for robust localization and mapping. In *Proc. 2005 IEEE Inter-*

[12] G. Klein and D. Murray. Parallel tracking and mapping for small AR workspaces. In *Proc. Sixth IEEE and ACM Int'l Symp. Mixed and Augmented Reality*, 2007.
[13] K. Konolige, J. Bowman, J. D. Chen, P. Mihelich, M. Calonder, V. Lepetit, and P. Fua. View-based maps. In *Proceedings of Robotics: Science and Systems*, Seattle, USA, June 2009.
[14] Kurt Konolige. Slam via variable reduction from constraint maps. In *ICRA*, pages 667-672, Barcelona, Spain, April 2005.
[15] Kurt Konolige and Motilal Agrawal. Frame-frame matching for realtime consistent visual mapping. In *Proc. 2007 IEEE International Conference on Robotics and Automation (ICRA '07)*, pages 2803-2810, Rome, Italy, April 2007.
[16] David Lowe. Distinctive image features from scale-invariant keypoints. *International Journal of Computer Vision*, 60(2):91-100, 2004.
[17] J. Matas, O. Chum, M. Urban, and T. Pajdla. Robust wide baseline stereo from maximally stable extremal regions. In *Proc. British Machine Vision Conference (BMVC '02)*, pages 384-393, Cardiff, September 2002. BMVA.
[18] Krystian Mikolajczyk and Cordelia Schmid. A performance evaluation of local descriptors. *IEEE Transactions on Pattern Analysis and Machine Intelligence (PAMI)*, 27(10):1615-1630, 2005.
[19] M. Montemerlo, S. Thrun, D. Koller, and B. Wegbreit. FastSLAM 2.0: An improved particle filtering algorithm for simultaneous localization and mapping that provably converges. In Georg Gottlob and Toby Walsh, editors, *Proc. Eighteenth International Joint Conference on Artificial Intelligence (IJCAI'03)*, Acapulco, Mexico, August 2003. Morgan Kaufmann.
[20] David Nister. An efficient solution to the five-point relative pose problem. *IEEE Transactions on Pattern Analysis and Machine Intelligence (PAMI)*, 26(6):756-777, June 2004.
[21] David Nister and Henrik Stewenius, Scalable recognition with a vocabulary tree. In *Proc. IEEE Intl. Conference on Computer Vision and Pattern Recognition (CVPR '06)*, pages 2161-2168, New York, N.Y., USA, June 2006. IEEE Computer Society.
[22] Jonathan R Shewchuk. An introduction to the conjugate gradient method without the agonizing pain. Technical report, Pittsburgh, Pa., USA, 1994.
[23] J. Sivic and A. Zisserman. Video Google: A text retrieval approach to object matching in videos. In *Proc. 9th IEEE International Conference on Computer Vision (ICCV'03)*, pages 1470-1477, Nice, France, October 2003.
[24] S. Thrun and M. Montemerlo. The GraphSLAM algorithm with applications to large-scale mapping of urban structures. *International Journal on Robotics Research*, 25(5/6):403-430, 2005.
[25] Sebastian Thrun and Michael Montemerlo. The graph slam algorithm with applications to large-scale mapping of urban structures. *The International Journal of Robotics Research*, 25(5-6):403-429, 2006.
[26] Bill Triggs, P. McLauchlan, Richard Hartley, and A. Fitzgibbon. Bundle adjustment—a modern synthesis. In B. Triggs, A. Zisserman, and R. Szeliski, editors, *Vision Algorithms Theory and Practice*, volume 1883 of *Lecture Notes in Computer Science*, pages 298-372. Springer-Verlag, 2000.
[27] B. Williams, M. Cummins, J. Neira, P. Newman, 1. Reid, and J. Tardos. An image-to-map loop closing method for monocular slam. In *Proc. Int. Conf Intelligent Robots and Systems*, 2008. To appear.

Video cameras are attractive sensors for SLAM due to their relatively low cost and high data rate. Much research has been devoted to their use.

Davison[5, 4] employs a Kalman filter and image-patch tracking to perform visual SLAM on a small scale with a single camera. Visual features are incrementally selected from the video and tracked through subsequent frames, with all measurements being aggregated into the common state with an extended Kalman filter (EKF). The cost of filter updates increases quadratically with the number of features tracked, and the tracking is not robust to discontinuous motion or low frame rates. Later developments[27] of the same platform allow multiple small maps to be connected in a larger network, with image-based relocalization when tracking fails.

Karlsson et al.[11, 9] construct a SLAM system using an image recognition system and a particle filter. Instead of filtering over individual tracked features, their method builds collections of features called landmarks and maintains their state in a FastSLAM[19] back-end filter. The particle filter provides more efficient performance than the EKF as the number of landmarks grows. The recognition front end does not depend on any tracking assumptions, making visual loop closure automatic.

Thrun et al.[24] present a graph-based framework for representing SLAM state and observations, and describe methods for refining the state estimate using the graph representation. All past poses of a robot are stored explicitly in the graph, along with all observations. The graph complexity grows steadily with time, and no state variables are permanently coalesced in recursive filter. Thus iterative refinement can eventually bring the state to consistent convergence despite the nonlinearity of the objective function. The described graph refinement is structurally identical to bundle adjustment methods[26] typically used for structure and motion in computer vision.

Konolige et al.[14] suggest how state complexity in such a graph representation might be reduced by marginalizing out past pose states. The statistical ramifications are discussed and methods examined, but no working application is presented.

Grisetti et al.[10] present techniques for incremental optimization of SLAM constraint networks such as the graph framework of Thrun.

Eade et al.[6] construct a graph structure over local maps, each maintained with a recursive filter. The system uses patch tracking during normal operation. A relocalization and recovery framework[7] is built on top of the graph of local maps using viewpoint invariant features and recognition methods. The graph is incrementally refined to improve the overall statistical estimate of the state.

Klein et al.[12] describe a system for tracking and mapping using only visual data in small spaces. Key frames are selected from the video stream and correspondences are established between these key frames. All correspondences and key frame poses are optimized jointly in a bundle adjustment running in parallel to the main operation of the system. At each frame, image features are tracked using patches and the camera pose is estimated relative to the current estimate of global structure. The system is extended by Castle et al.[3] to support relocalisation using image-based comparisons.

Konolige et al.[15] present a system similar to Klein's that employs key frames and global optimization to achieve SLAM. Additionally, the system of Konolige aggregates multiple tracking results between keyframes into visual odometry measurements, allowing connections between key frames that are visually separated. The system is demonstrated on a mobile robot with stereo camera. The system is then extended to use view-based recognition, relying less on tracking assumptions[13].

Despite the considerable effort in the field, an efficient method for quickly restructuring a SLAM graph to a form more conducive to system updates and analysis is still required. That is, there exists a need for graph management methods which improve the speed of SLAM operation while retaining a desired level of information content.

SUMMARY OF THE INVENTION

Certain embodiments contemplate a method for localization and mapping in a system comprising a processor and a camera, wherein the processor is configured to generate a graph with a plurality of pose nodes and a plurality of edges. The method comprises updating the graph if the number of pose nodes in the graph exceeds a first threshold, wherein updating comprises: i) identifying a pose node directly linked to associated Markov blanket nodes with two or more incident edges; ii) composing said incident edges to generate one or more new edges between pairs of said associated Markov blanket nodes; and iii) removing the identified pose node and said two or more incident edges. The method may also comprise removing at least one edge of said plurality of edges present in the graph if the total number of edges in the graph exceeds a second threshold. The method may also comprise updating an estimate of a location of the remaining pose nodes based at least in part on the plurality of edges present in the graph.

In some embodiments, identifying a pose node comprises: i) for each pose node in the graph, determining a total number of edges that would be present in the graph if the pose node was removed and incident edges composed to generate one or more new edges between pairs of Markov blanket nodes; and ii) selecting the pose node that would result in the least total number of edges if removed from the graph. In some embodiments composing said incident edges comprises: i) generating an estimate of a relative pose between a pair of Markov blanket nodes, the relative pose estimate being based in part on a vector sum of relative pose measurements associated with two or more incident edges; and ii) generating a covariance estimate based on covariance estimates associated with the two or more incident edges. In some embodiments, removing at least one edge of said plurality of edges present in the graph comprises: i) generating a residual value for each edge in the graph, the residual value being based at least in part on the difference between the relative pose of the nodes connected by the edge in the graph and the relative pose given by the transformation value associated with the same edge; ii) identifying the edge with lowest residual value; and iii) removing the identified edge from the graph. In some embodiments, the system is a mobile robot further comprising a navigation system and a path planner and the method further comprises: i) generating a set of robot move commands to traverse a trajectory; and ii) after updating the estimate of the location of the pose nodes present in the graph, updating the set of move commands for navigating the robot based at least in part on the trajectory and updated estimate of the location of the pose nodes present in the graph and a plurality of landmark pose nodes. In some embodiments, a pose node comprises a pose of the robot; a landmark node comprises a pose of the robot, a landmark identifier corresponding to one or more objects, and an estimate of the location of each of the one or more objects; and an edge comprises a rigid transformation relating position and orientation of the robot at two locations. In some embodiments, the method further comprises: capturing at least one image while traversing the trajectory; determining whether the one or more images depict a known landmark or a new landmark; and updating the graph. In these embodiments, updating the graph comprises: i) generating a new pose node if the at least one image depicts a known landmark; ii) generating a new landmark pose node if the at least one image depicts a new landmark; and iii) generating at least one new edge associating the new pose node or new landmark pose node with one or more existing nodes in the graph. Some embodiments further comprise extracting a plurality of features, each feature comprising a scale-invariant feature transform (SIFT) feature. In some embodiments, composing said incident edges to generate one or more new edges between pairs of said associated Markov blanket nodes further comprises: combining at least one of said new edges with an existing edge by generating a weighted average of a mean of the new edge and a mean of the existing edge, and generating a new covariance estimate based on the sum of the inverse of the covariance estimate of the new edge and the covariance estimate of the existing edge.

Certain embodiments contemplate a mobile electronic device comprising: a camera configured to capture an image; a navigation system, the navigation system configured to maintain a graph comprising a plurality of pose nodes and edges. In these embodiments, the navigation system is configured to: update the graph if the number of pose nodes in the graph exceeds a first threshold, comprising: i) identifying a pose node directly linked to associated Markov blanket nodes with two or more incident edges; ii) composing said incident edges to generate one or more new edges between pairs of said associated Markov blanket nodes; and iii) removing the identified pose node and said two or more incident edges. The navigation system may also be configured to remove at least one edge of said plurality of edges present in the graph if the total number of edges in the graph exceeds a second threshold and update an estimate of a location of each of the remaining pose nodes based at least in part on the plurality of edges present in the graph.

In some embodiments, identifying a pose node comprises: i) for each pose node in the graph, determining a total number of edges that would be present in the graph if the pose node was removed and incident edges composed to generate one or more new edges between pairs of blanket nodes; and ii) selecting the pose node that would result in the least total number of edges if removed from the graph. In some embodiments, composing said incident edges comprises: i) generating an estimate of a relative pose between a pair of blanket nodes, the relative pose estimate being a vector sum of relative pose measurements associated with two or more incident edges; and ii) generating a covariance estimate based on covariance estimates associated with the two or more incident edges. In some embodiments, removing at least one edge of said plurality of edges present in the graph comprises: i) generating an residual value for each edge in the graph, the residual value being based at least in part on the difference between the relative pose of the nodes connected by the edge in the updated graph and the relative pose given by the mean of the same edge; ii) identifying the edge with lowest residual value; and iii) removing the identified edge from the graph. In some embodiments, the mobile electronic device is a mobile robot further comprising a path planner. In these embodiments, the planner may be further configured to: i) generate a set of robot move commands to traverse a trajectory; and ii)

after updating the estimate of the location of the remaining pose nodes, updating the set of move commands for navigating the robot based at least in part on the trajectory and updated estimate of the location of the remaining pose nodes. In some embodiments, a pose node comprises a pose of the robot; a landmark node comprises a pose of the robot, a landmark identifier corresponding to one or more objects, and an estimate of the location of each of the one or more objects; and an edge comprises a rigid transformation relating position and orientation of the robot at two locations. In some embodiments the navigation system is further configured to: capture at least one image while traversing the trajectory; determine whether the one or more images depict a known landmark or a new landmark; and to update the graph. Updating the graph may comprise: i) generating a new pose node if the at least one image depicts a known landmark; ii) generating a new landmark node if the at least one image depicts a new landmark; and iii) generating at least one new edge associating the new pose node or new landmark node with one or more existing nodes in the graph. In some embodiments the navigation system is further configured to extract a plurality of features, each feature comprising a scale-invariant feature transform (SIFT) feature. In some embodiments composing said incident edges to generate one or more new edges between pairs of said associated blanket nodes further comprises: combining at least one of said new edges with an existing edge by averaging the estimate of a relative pose of the new edge and existing edge, and averaging the covariance estimate of the new edge and existing edge.

Certain embodiments disclose a method for navigating a mobile system, the method implemented on one or more computer systems, comprising the steps of: matching landmarks in a mobile device by. Matching the landmarks may comprise: retrieving features from a global database; ranking landmarks by visual similarity; selecting a plurality of candidate landmarks; for each of the plurality of candidate landmarks: retrieving features in a local database; performing robust pose estimation; performing bundle adjustment; determine an observation pose and covariance; selecting the best candidate as the matching landmark.

Certain embodiments contemplate a method for navigating a mobile system, the method implemented on one or more computer systems, comprising the steps of: creating landmarks in a mobile device. Creating landmarks may comprise: finding inlier matches by camera motion and epipolar geometry; refining camera motion using inlier matches; determining if sufficient inliers exist; determining if a tolerance has been reached; adjusting a tolerance based on the determination that a tolerance has been reached; and returning inliers and camera motion as a new landmark.

Certain embodiments contemplate a non-transitory computer readable medium comprising instructions configured to cause one or more computer systems in communication with a mobile electronic device to generate a graph with a plurality of pose nodes and a plurality of edges. The medium may also cause the systems to update the graph if the number of pose nodes in the graph exceeds a first threshold, comprising: i) identifying a pose node directly linked to associated blanket nodes with two or more incident edges; ii) composing said incident edges to generate one or more new edges between pairs of said associated blanket nodes; and iii) removing the identified pose node and said two or more incident edges. The medium may also cause the systems to remove at least one edge of said plurality of edges present in the graph if the total number of edges in the graph exceeds a second threshold. The medium may also cause the systems to update an estimate of a location of each of the remaining pose nodes based at least in part on the plurality of edges present in the graph.

In some embodiments identifying a pose node comprises: i) for each pose node in the graph, determining a total number of edges that would be present in the graph if the pose node was removed and incident edges composed to generate one or more new edges between pairs of blanket nodes; and ii) selecting the pose node that would result in the least total number of edges if removed from the graph. In some embodiments composing said incident edges comprises: i) generating an estimate of a relative pose between a pair of blanket nodes, the relative pose estimate being a vector sum of relative pose measurements associated with two or more incident edges; and ii) generating a covariance estimate based on covariance estimates associated with the two or more incident edges. In some embodiments removing at least one edge of said plurality of edges present in the graph comprises: i) generating a current graph mean; ii) generating an error estimate for each edge, the error estimate being based at least in part on the difference between the pose of each of the plurality of edges present in the graph and the current graph mean; iii) identifying at least one edge having a lowest error estimate; and iv) removing the at least one identified edge from the graph. In some embodiments, the system is a mobile robot further comprising a navigation system and a path planner. In some embodiments the system is a mobile robot further comprising a navigation system and a path planner. In some embodiments the method further comprises: i) generating a set of robot move commands to traverse a trajectory; and ii) after updating the estimate of the location of the remaining pose nodes, updating the set of move commands for navigating the robot based at least in part on the trajectory and updated estimate of the location of the remaining pose nodes. In some embodiments: i) a pose node comprises a pose of the robot; ii) a landmark node comprises a pose of the robot, a landmark identifier corresponding to one or more objects, and an estimate of the location of each of the one or more objects; and iii) an edge comprises a rigid transformation relating position and orientation of the robot at two locations. In some embodiments the method further comprises: capturing at least one image while traversing the trajectory; determining whether the one or more images depict a known landmark or a new landmark. In these embodiments updating the graph may comprise: i) generating a new pose node if the at least one image depicts a known landmark; ii) generating a new landmark node if the at least one image depicts a new landmark; and iii) generating at least one new edge associating the new pose node or new landmark node with one or more existing nodes in the graph. In some embodiments the method further comprises extracting a plurality of features, each feature comprising a scale-invariant feature transform (SIFT) feature. In some embodiments, composing said incident edges to generate one or more new edges between pairs of said associated blanket nodes further comprises: i) combining at least one of said new edges with an existing edge by averaging the estimate of a relative pose of the new edge and existing edge, and averaging the covariance estimate of the new edge and existing edge.

Certain embodiments contemplate a mobile electronic device comprising: a camera configured to capture an image; a navigation system, the navigation system configured to maintain a graph comprising a plurality of pose nodes and edges. The navigation system may be configured to: update the graph if the number of pose nodes in the graph exceeds a first threshold. Updating the graph may comprise: i) identifying a pose node directly linked to associated blanket nodes with two or more incident edges; ii) composing said incident edges to generate one or more new edges between pairs of said associated blanket nodes; and iii) removing the identified pose node and said two or more incident edges. The navigation system may also be configured to remove at least one edge of said plurality of edges present in the graph if the total number of edges in the graph exceeds a second threshold; and update an estimate of a location of each of the remaining pose nodes based at least in part on the plurality of edges present in the graph.

In some embodiments identifying a pose node comprises: i) for each pose node in the graph, determining a total number of edges that would be present in the graph if the pose node was removed and incident edges composed to generate one or more new edges between pairs of blanket nodes; and ii) selecting the pose node that would result in the least total number of edges if removed from the graph. In some embodiments composing said incident edges comprises: i) generating an estimate of a relative pose between a pair of blanket nodes, the relative pose estimate being a vector sum of relative pose measurements associated with two or more incident edges; and ii) generating a covariance estimate based on covariance estimates associated with the two or more incident edges. In some embodiments removing at least one edge of said plurality of edges present in the graph comprises: i) generating a current graph mean; ii) generating an error estimate for each edge, the error estimate being based at least in part on the difference between the pose of each of the plurality of edges present in the graph and the current graph mean; iii) identifying at least one edge having a lowest error estimate; and iv) removing the at least one identified edge from the graph. In some embodiments, the system is a mobile robot further comprising a navigation system and a path planner. In some embodiments the system is a mobile robot, the method further comprising: i) generating a set of robot move commands to traverse a trajectory; and ii) after updating the estimate of the location of the remaining pose nodes, updating the set of move commands for navigating the robot based at least in part on the trajectory and updated estimate of the location of the remaining pose nodes. In some embodiments a pose node comprises a pose of the robot; a landmark node comprises a pose of the robot, a landmark identifier corresponding to one or more objects, and an estimate of the location of each of the one or more objects; and an edge comprises a rigid transformation relating position and orientation of the robot at two locations. In some embodiments the navigation system is further configured to: capture at least one image while traversing the trajectory; determine whether the one or more images depict a known landmark or a new landmark. The system may also update the graph by: i) generating a new pose node if the at least one image depicts a known landmark ii) generating a new landmark node if the at least one image depicts a new landmark; and iii) generating at least one new edge associating the new pose node or new landmark node with one or more existing nodes in the graph. In some embodiments the navigation system is further configured to extract a plurality of features, each feature comprising a scale-invariant feature transform (SIFT) feature. In certain embodiments a blanket node comprises a node immediately neighboring a selected node. In some embodiments, composing said incident edges to generate one or more new edges between pairs of said associated blanket nodes further comprises: i) combining at least one of said new edges with an existing edge by averaging the estimate of a relative pose of the new edge and existing edge, and averaging the covariance estimate of the new edge and existing edge.

Certain embodiments contemplate a method for navigating a mobile system, the method implemented on one or more computer systems, comprising the steps of: matching landmarks in a mobile device by: retrieving features from a global database; ranking landmarks by visual similarity; and selecting a plurality of candidate landmarks. The method may also comprise, for each of the plurality of candidate landmarks: retrieving features in a local database; performing robust pose estimation; performing bundle adjustment; determine an observation pose and covariance; select the best candidate as the matching landmark.

Certain embodiments contemplate a method for navigating a mobile system, the method implemented on one or more computer systems, comprising the steps of: creating landmarks in a mobile device by: finding inlier matches by camera motion and epipolar geometry; refining camera motion using inlier matches; determining if sufficient inliers exist; determining if a tolerance has been reached; adjusting a tolerance based on the determination that a tolerance has been reached; and returning inliers and camera motion as a new landmark.

BRIEF DESCRIPTION OF THE DRAWINGS

These and other features of the invention will now be described with reference to the drawings summarized below. These drawings (not to scale) and the associated descriptions are provided to illustrate preferred embodiments of the invention and are not intended to limit the scope of the invention.

FIG. 2A illustrates a robot reference frame in the context of creating a record in a landmark database.

FIG. 2B illustrates a landmark reference frame and a robot reference frame in the context of revisiting a landmark.

FIG. 2C illustrates the convention used to describe a $\Delta x$ and a $\Delta y$ calculation.

FIG. 2D illustrates the convention used to describe a $\Delta \theta$ calculation.

GLOSSARY OF TERMS

Figure 1:
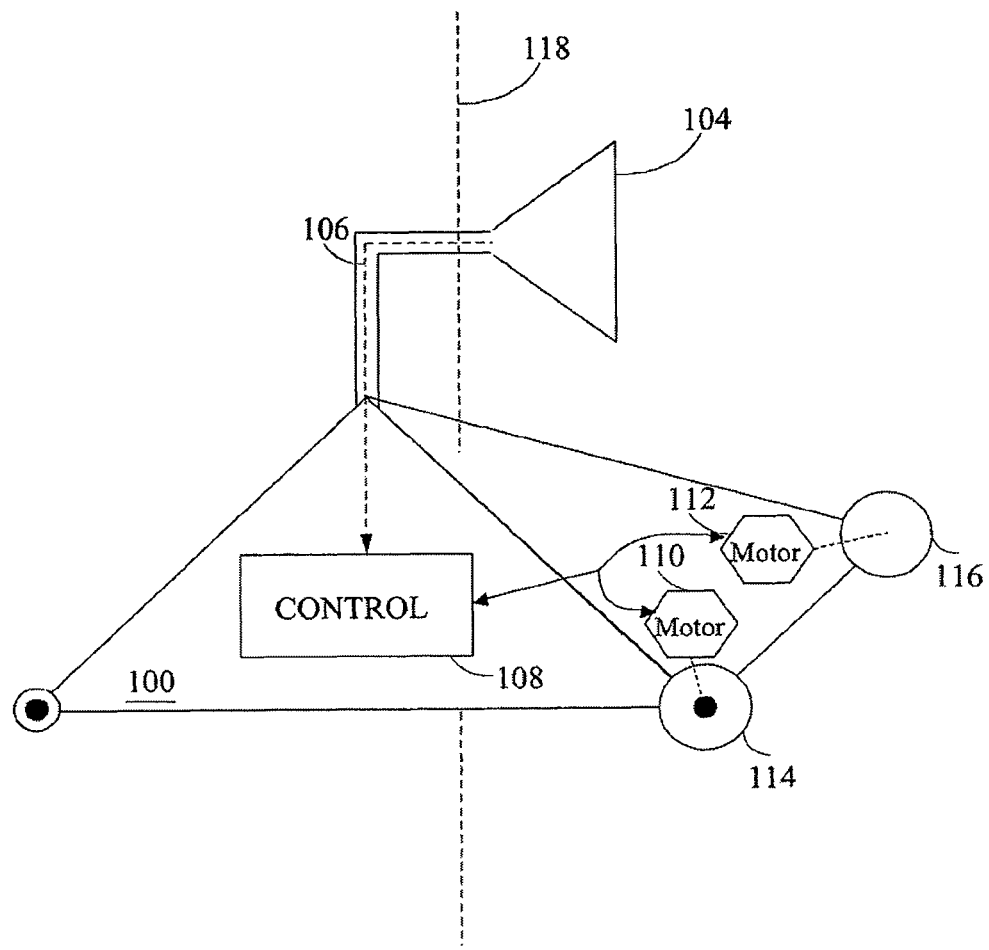
FIG. 1 illustrates an example of a robot.

The following glossary of terms provides examples of each of the following words and phrases.

pose: the position and orientation, such as the position and orientation of a robot, in some reference frame.

robot pose (also known as global robot pose): the position and orientation of a robot in a global reference frame. In a configuration where a robot travels in two dimensions, such as along the surface of a floor, the robot pose can be specified by a two-dimensional position (x,y) and a heading ($\theta$).

relative robot pose: the position and orientation of a robot with respect to another reference frame, such as a landmark reference frame.

global reference frame: a reference frame that is fixed to the environment.

landmark reference frame: the reference frame in which a landmark's 3-D structure is defined.

3-D structure: the 3-D coordinates of a set of 3-D features.

landmark: a landmark comprises a collection of 3-dimensional (3-D) features and a unique identifier.

3-D feature: an observable location, such as, for example, a portion of an object, with an associated 3-D coordinate in a reference frame and one or more associated 2-D features observable when viewing the location. It will be understood that a 3-D feature can be observed from one or more perspectives with varying 2-D features.

2-D feature: a position in an image and a descriptor that relates to the pixel at the position or the pixels in some neighborhood around that position.

physical landmark: a collection consisting of one or more visually-identifiable 3-D features in the environment.

landmark pose: the pose of the landmark reference frame in the global reference frame.

camera pose: a relative pose in the landmark reference frame based on the location of the visual sensor, which can be, for example, a camera.

DETAILED DESCRIPTION

Although this invention will be described in terms of certain preferred embodiments, other embodiments that are apparent to those of ordinary skill in the art, including embodiments that do not provide all of the benefits and features set forth herein, are also within the scope of this invention.

Embodiments of the invention advantageously use one or more visual sensors and one or more dead reckoning sensors to process Simultaneous Localization and Mapping (SLAM). The combination of SLAM with visual sensors will hereafter be referred to as VSLAM. Advantageously, such visual techniques can be used by a vehicle, such as a mobile robot, to autonomously generate and update a map. In one embodiment, VSLAM is advantageously used by a portion of a vehicle, such as by an "arm" of a vehicle. In contrast to localization and mapping techniques that use laser rangefinders or other range-based devices or sensors, the visual techniques are economically practical in a wide range of applications and can be used in relatively dynamic environments, such as environments in which people move. Certain embodiments maintain the representation of SLAM information in a relatively computationally-efficient manner, thereby permitting the SLAM processes to be performed in software using relatively inexpensive microprocessor-based computer systems.

It will be understood by one of ordinary skill in the art that mobile robots can be embodied in a variety of forms. In these variety of forms, a robot may be referred to by a different name, such as by a function that is performed by the robot. For example, a robot may be referred to as an automated sweeper or as an automated vacuum cleaner. In one embodiment, a mobile robot corresponds to a self-propelled object that can navigate in an autonomous or semi-autonomous manner. Examples of autonomous or semi-autonomous mobile robots include, but are not limited to, mobile robots for use in automated floor cleaners, humanoid robots, robots for experimentation and lab use, robots for delivering supplies, robots for exploring confined or inaccessible spaces, robots for entertainment or play, and the like.

The VSLAM techniques disclosed herein can advantageously be applied to autonomous robots and to non-autonomous robots. For example, the VSLAM techniques can be used with a manually-driven vehicle, such as a remotely-controlled vehicle for bomb detection or other mobile electronic device. For example, the VSLAM techniques can be advantageously used in a remote-control application to assist an operator to navigate around an environment. In one embodiment, a vehicle can include various operational modes, such as a mode for manual control of the vehicle and another mode for an autonomous control of the vehicle. For example, the vehicle can be manually-driven during an initial mapping stage, and then later, the vehicle can be configured for autonomous control. In another embodiment, the VSLAM techniques can be used by a scout to create a map of the region. The scout can correspond to, for example, a person or another animal, such as a dog or a rat. The VSLAM used by the scout can be coupled to a video camera carried by the scout to observe the environment and to a dead reckoning device, such as an odometer, a pedometer, a GPS sensor, an inertial sensor, and the like, to measure displacement. The map generated by the scout can be stored and later used again by the scout or by another entity, such as by an autonomous robot. It will be understood that between the generation of the map by the scout and the use of the map by another entity, there can be additional processing to accommodate differences in visual sensors, differences in the installed height of the visual sensor, and the like. One may readily recognize a variety of other non-autonomous systems which may employ the various embodiments disclosed herein. For example, smart phones, tablets, and other mobile devices may likewise employ these embodiments, and may use gyros, accelerometers, and other IMU units to perform the operations disclosed herein. One will recognize that the tablet, smart phone, or other mobile device may serve as the navigation system and/or planner as described herein. In some embodiments, the mobile system may be interfaced with a robot, such as when a smart phone is inserted into a robot chassis.

Robots can be specified in a variety of configurations. A robot configuration typically includes at least one dead reckoning sensor and at least one video sensor. Another name for dead reckoning is "ded" reckoning or deduced reckoning. An example of a dead reckoning sensor is a wheel odometer, where a sensor, such as an optical wheel encoder, measures the rotation of a wheel. The rotation of wheels can indicate distance traveled, and a difference in the rotation of wheels can indicate changes in heading. With dead reckoning, the robot can compute course and distance traveled from a previous position and orientation (pose) and use this information to estimate a current position and orientation (pose). While relatively accurate over relatively short distances, dead reckoning sensing is prone to drift over time. It will be understood that the information provided by a dead reckoning sensor can correspond to either distance, to velocity, or to acceleration and can be converted as applicable. Other forms of dead reckoning can include a pedometer (for walking robots), measurements from an inertial measurement unit, optical sensors such as those used in optical mouse devices, and the like. Disadvantageously, drift errors can accumulate in dead reckoning measurements. With respect to a wheel odometer, examples of sources of drift include calibration errors, wheel slippage, and the like. These sources of drift can affect both the distance computations and the heading computations.

An example of a visual sensor is a digital camera. Embodiments of the invention advantageously use a visual sensor to recognize landmarks on a visual basis. These observations of visual landmarks can advantageously provide a global indication of position and can be used to correct for drift in the dead reckoning sensors. In contrast to simultaneous localization and mapping (SLAM) techniques that use a laser rangefinder, embodiments of the invention can use data from visual sensors and from dead reckoning sensors to provide simultaneous localization and mapping (SLAM) with advantageously little or no additional cost.

Exemplary Robot with VSLAM

FIG. 1 illustrates an example of a mobile robot 100 in which a VSLAM system can be incorporated. The illustrated robot 100 includes a visual sensor 104, which is used to visually recognize landmarks such that a SLAM module can determine global position. A broad variety of visual sensors can be used for the visual sensor 104. For example, the visual sensor 104 can correspond to a digital camera with a CCD imager, a CMOS imager, an infrared imager, and the like. The visual sensor 104 can include normal lenses or special lenses, such as wide-angle lenses, fish-eye lenses, omni-directional lenses, and the like. Further, the lens can include reflective surfaces, such as planar, parabolic, or conical mirrors, which can be used to provide a relatively large field of view or multiple viewpoints. In another example, the visual sensor 104 can correspond to a single camera or to multiple cameras. In one embodiment, the VSLAM system is advantageously configured to operate with a single camera, which advantageously reduces cost when compared to multiple cameras.

The motors 110, 112 of the illustrated robot 100 are coupled to wheels 114, 116 to provide locomotion for the robot 100. It will be understood by one of ordinary skill in the art that instead of or in addition to wheels, other embodiments of the robot can use legs, tracks, rollers, propellers, and the like, to move around. In the illustrated embodiment, information regarding the rotation of the wheels, also known as odometry, is provided as an input to a control 108. Image data 106 from the visual sensor 104 is also provided as an input to the control 108 for the robot 100. In one embodiment, the VSLAM system is embodied within the control 108. In the illustrated embodiment, the control 108 is coupled to motors 110, 112 to control the movement of the robot 100. For clarity, a power source for the robot 100, such as a battery, is not shown in FIG. 1.

In response to the image data 106, the control 108 can provide control signals to the motors 110, 112 that control the movement of the robot 100. For example, the control 108 can provide control signals to instruct the robot to move forward, to stop, to move backward, to turn, to rotate about a vertical axis, and the like. When the robot rotates around a vertical axis, such as the exemplary vertical axis 118 shown in FIG. 1, this rotation is referred to as "yaw."

The control 108 can include hardware, such as microprocessors, memory, etc., can include firmware, can include software, can include network communication equipment, and the like. In one embodiment, the control 108 uses dedicated hardware, such as single-board computers, application specific integrated circuits (ASICs), field programmable gate arrays (FPGAs), and the like.

In one embodiment, the control 108 is implemented by interfacing to a general-purpose computer, such as to a laptop computer, and by software executing in the computer. In one example, a laptop computer with an Intel® Pentium® 4 processor with a 2.4 GHz clock speed can process landmark generation processes in about 1 second and can process visual measurements in about half a second. It will be understood that the processing time can depend on parameters such as image resolution, frame rates, bus speeds, and the like. The software can include instructions that are embodied in a tangible medium, such as a hard disk or an optical disk. Data processing for the robot 100 can be performed entirely within the robot 100 such that the robot 100 is autonomous, or the data processing can be performed partially outside the robot 100. For example, the control 108 can be configured to relay data to another computer, via a network such as a wireless network, where a portion of the data processing takes place.

Characteristics of VSLAM Operation

As a robot with VSLAM travels in its environment the robot can observe physical landmarks. As will be explained in greater detail later, these physical landmarks can be related to landmarks created and stored in a database. Advantageously, the VSLAM techniques do not require artificial navigational beacons to be placed in the environment. Rather, VSLAM techniques can conveniently be used in unaltered and unmodified environments. However, it will be understood that should artificial navigational beacons be present in an environment, the VSLAM techniques can utilize features from the beacons and/or the surrounding environment as landmarks. For example, in a landmarks database, where a landmark can correspond to a collection of 3-D features and the corresponding 2-D features from which the 3-D features are computed. It should also be noted that a physical landmark can correspond to one or more physical objects, such as, for example, an object mounted to a wall and a portion of the wall. These physical landmarks are used to estimate global position such that drift in dead reckoning measurements can later be corrected or compensated. It should be noted that a physical landmark will typically be arranged in a particular location and orientation in the global reference frame, and that the observing robot will be at a different location and orientation. In certain embodiments, the locations of the features of the physical landmark are referenced relative to the landmark reference frame. Then, the pose of the landmark itself is referenced to the global reference frame.

It will be understood that while the VS LAM system is generally described in the context of a robot, the VSLAM system can also be used in a variety of devices such that the robot pose can also correspond to a device pose. The orientation ($\theta$) of the robot as it observes the physical landmark and creates the landmark in the database is indicated with an arrow. In one embodiment, the initial estimate of the pose of the "landmark" that is referenced in the global reference frame corresponds to the pose of the robot when creating the landmark. When a new physical landmark is observed and a landmark is created, the set of 3-D features and their corresponding 2-D features that visually identify the landmark are stored. In one example, the 2-D features correspond to SIFT features. The concept of SIFT has been extensively described in the literature. See David G. Lowe, *Local Feature View Clustering for* 3*D Object Recognition*, Proceedings of the IEEE Conference on Computer Vision and Pattern Recognition, Kauai, Hi. (December 2001). One will readily recognize variations and alternatives to SIFT, such as SURF, BRIEF, etc.

Over relatively short distances, dead reckoning measurements, such as those obtained from odometry readings, can be quite accurate. However, due to calibration errors, wheel slippage, and the like, these dead reckoning measurements can drift or accumulate errors over distance and/or time such that a position calculated after a relatively long period of time can vary significantly from a position that was initially calculated even when the errors in the dead reckoning measurements are relatively small. For example, over an extended period of time, the robot can make relatively many traversals over an environment, thereby accumulating errors in drift.

Advantageously, the VSLAM techniques can wholly or partially compensate for the drift in the dead reckoning measurements such that even after a robot has traveled over relatively large distances, the global position of the robot can be maintained with relatively high accuracy. In one embodiment, the VSLAM techniques maintain the accuracy of the global robot pose estimate to exceed the accuracy of the visual measurements even after the robot has traversed relatively long distances. In the illustrated example, the visual sensor used was a relatively simple and inexpensive color camera with a resolution of 640×480, and the accuracy of the visual measurements was maintained to about 10 centimeters (cm). It will be understood that other visual sensors, such as grayscale cameras and infrared cameras, can also be used. In some embodiments, a trinoculor camera, such as the Digiclops™ camera available from Point Grey Research Inc., of Vancouver, British Columbia, Canada may be used.

Advantageously, camera systems that provide a stereoscopic view, such as binocular or trinocular camera systems, can be used to identify 3-D features of a landmark and to estimate displacements to the 3-D features in a relatively fast and efficient manner. Disadvantageously, such cameras are produced in relatively low volumes and can be relatively expensive relative to single visual sensor cameras due to the extra components and to the relative lack of economies of scale.

Illustrations of Visual Measurements

FIGS. 2A and 2B (not to scale) illustrate a robot 502 and a corresponding robot reference frame 520. In the illustrated embodiment, the robot reference frame 520 is used by the visual localization portion of a VSLAM system. The zero vector for the robot reference frame 520 moves with the robot 502. As such, the robot reference frame 520 is a relative reference frame, as opposed to a global reference frame that has a globally-fixed zero vector. For example, the zero vector for the robot reference frame 520 can be located approximately at the camera of the robot 502 and is illustrated in FIG. 2A by a pose "A" 522 and in FIG. 2B by a pose "B" 524.

As the robot 502 travels in its environment, the robot 502 detects new physical landmarks and revisits previously detected or "old" physical landmarks. FIG. 2A illustrates the robot reference frame 520 in the context of "creating" or recognizing a new landmark, i.e., creating an entry in a database for a freshly observed landmark. A process in a visual front end or visual localization process for recognizing a new landmark will be described in greater detail later in connection with FIG. 4. FIG. 2B illustrates the robot reference frame 520 in the context of revisiting a previously observed and recorded landmark. The robot reference frame 520 moves with the robot 502 such that the pose "A" 522 corresponding to the pose of the robot, with respect to the global reference frame, at the time when the landmark was created, and the pose "B" 524 corresponding to the pose of the robot, with respect to the global reference frame, at the time when the landmark was revisited can be different as illustrated in FIG. 2B.

Returning now to FIG. 2A, in the illustrated embodiment, a physical landmark 504 is identified by its 3-D features. In one embodiment, 3-D features are extracted by triangulating 2-dimensional (2-D) features by solving the structure and motion problem using the trifocal tensor method. In one embodiment, the 2-D features are SIFT features. A discussion of SIFT features can be found in Lowe, id. See Olivier Faugeras and Quang-Tuan Luong, *The Geometry of Multiple Images*, MIT Press (2001) for a discussion of the trifocal tensor method. It will be understood that the physical landmark 504 can be characterized by relatively many 3-D features and that the physical landmark 504 can correspond to one or more physical objects or to a portion of physical object. For clarity, the physical landmark 504 illustrated in FIG. 2A is drawn with 3 3-D features: a first feature 506, a second feature 508, and a third feature 510. When the robot 502 observes a new physical landmark, the visual front end determines the displacements or positions from the robot 502 to the respective features. When a landmark is created, the robot 502 can reference displacements to visual features using the current position of the robot reference frame 520 as an initial estimate of a landmark reference frame. For example, in the example illustrated in FIG. 2A, arrows $r_1$, $r_2$, and $r_3$ represent 3-dimensional displacements, such as displacements in x, y, and z dimensions between the robot 502 and the first feature 506, the second feature 508, and the third feature 510, respectively. It should be noted that these x, y, and z displacements are relative to the robot reference frame of the robot 502 and not to the global reference frame. In one embodiment, the x, y, and z displacements correspond to relative displacements in the fore-aft dimension, in the left-right dimension, and in the up-down dimension, respectively. In addition, the 2-D image coordinates or locations for the 3-D features are also stored. For example, where the visual sensor corresponds to a 640×480 color camera, the 2-D image coordinates correspond to one or more pixel locations that correspond to the 3-D features. It will be understood that 3-D features will typically occupy more than merely a single point in space.

In one embodiment, where the robot 502 moves as the images are taken for the perspective views for the computation of the displacements $r_1$, $r_2$, and $r_3$, the displacements from the robot 502 to the features are referenced to the first image in a three-image set. However, it will be appreciated that any identifiable reference frame can be used as the reference. For example, the other images in the image set can also be used as the reference, so long as the image used as the reference is consistently selected. It should also be noted that an identifiable reference frame that does not correspond to any particular image can also be used. For example, in the illustrated embodiment, the pose of the robot corresponding to the first image in the three-image set is used as the local reference frame for the particular landmark, i.e., the landmark reference frame.

Figure 3:
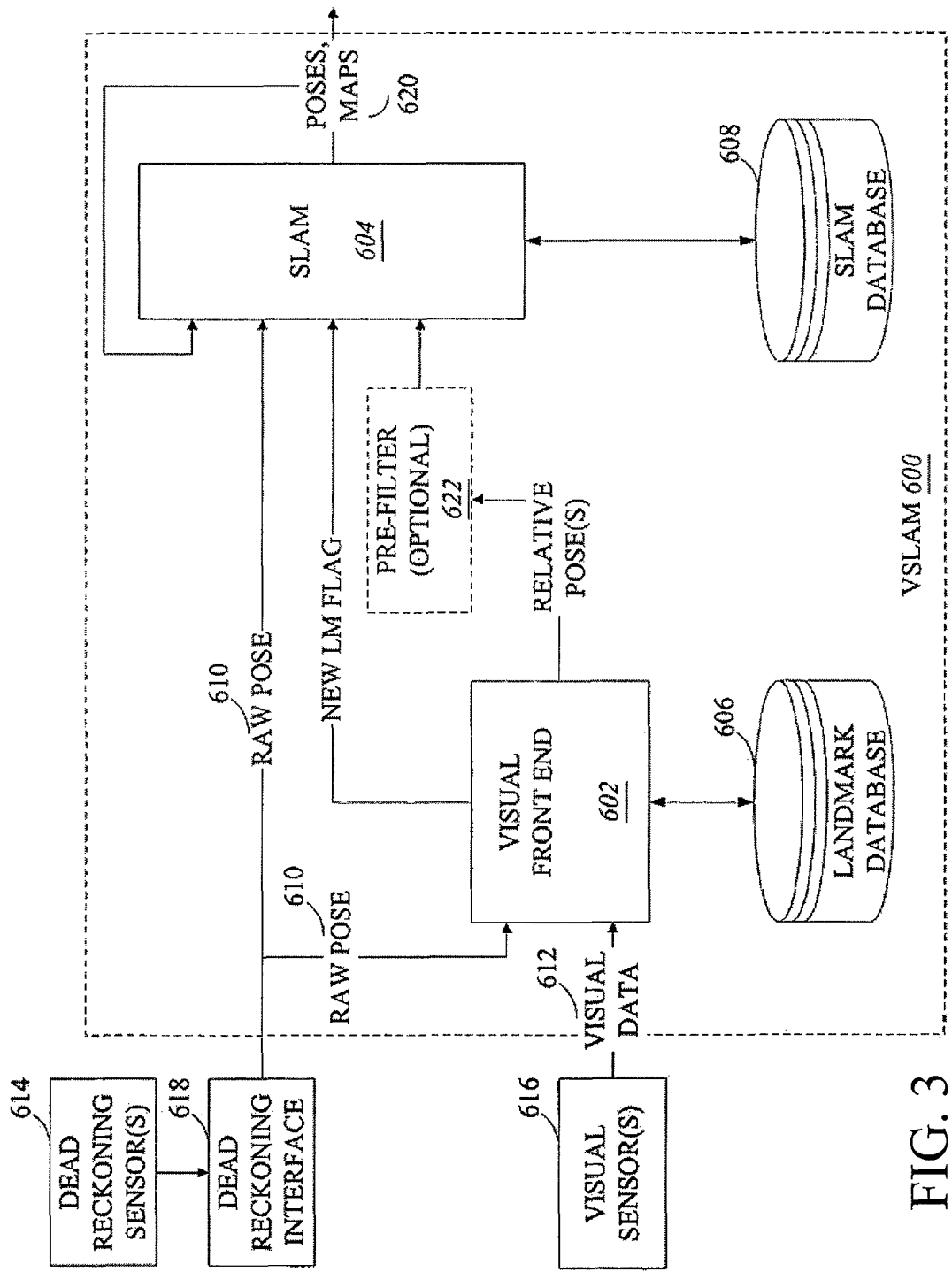
FIG. 3 illustrates one embodiment of a system architecture for a VSLAM system.

In one embodiment, when a new physical landmark is encountered, the Visual Front End 602 stores (i) the 3-D coordinates of the 3-D features in the local reference frame for the landmark in a database, such as a landmark database 606 of FIG. 3 and (ii) the 2-D features for a selected image, such as the 2-D features of the first image, corresponding to the 3-D features. In one embodiment, when the new physical landmark is encountered and processed by the Visual Front End 602, the SLAM module 604 correspondingly "creates" a landmark by storing an initial estimate of the landmark pose, such as the global robot pose when the landmark was created, computed from the change in pose as provided by the dead reckoning data for each particle from the last pose of the robot for the corresponding particle.

FIG. 2B illustrates an example of the robot 502 revisiting the physical landmark 504 earlier observed, termed "new view." In FIG. 2B, the robot 502 is displaced from the original pose "A," which corresponds to the "landmark reference frame," to a new pose "B." Correspondingly, the robot reference frame also moves with the robot 502. The robot 502 again observes the first feature 506, the second feature 508, and the third feature 510. It will be understood that as the robot 502 moves about, some of the features of a physical landmark may not be observable in all locations. The Visual Front End 602 of the robot 502 computes the relative pose, i.e., the difference between new pose "B" and pose "A," as illustrated in FIGS. 2C and 2D and provides one or more relative poses to one or more identified landmarks as an input to the SLAM module 604 or to the Pre-Filter module 622. In one embodiment, the Visual Front End 602 computes the relative pose of the robot with respect to the stored landmark reference frame illustrated as "A" by finding the relative pose of the robot that minimizes the projection error from the 3-D features onto the 2-D coordinates of the first feature 506, the second feature 508, and the third feature 510.

Dashed lines between the robot 502 and the features 506, 508, 510 represent the projection of the features 506, 508, 510 onto an image plane, which is illustrated by a line 530 in the top view of FIG. 2B. It will be understood that the image plane for a visual sensor, such as a camera, will typically be approximately perpendicular to the focal axis of the camera. It will also be understood that the line 530 approximately represents the field of view of the camera for the projection of the points and does not indicate any particular distance from the camera.

Given the correspondence between the 2-D features in the new view and the 3-D features of the landmark, the Visual Front End 602 can estimate the relative pose by, for example, minimizing projection error. The relative pose reveals a change in pose from (i) the pose when the landmark was created and stored in the database to (ii) the pose when the physical landmark was re-observed. It will be understood that such a relative pose can be represented in a variety of coordinate forms. For example, the translational component of the relative pose along the floor can be represented by Cartesian coordinates (x,y). However, it will also be understood that polar coordinates ($\rho,\phi$) can also be used. FIG. 2C and FIG. 2D graphically illustrate the relative pose also known as "camera pose" components of $\Delta x$, $\Delta y$, and $\Delta \theta$. While the term "camera pose" includes the word "camera," it will be understood that visual sensors other than cameras can also be used. The relative pose can also include a change in vertical dimension, roll, and pitch, which can be the result of uneven floor surfaces, robot and/or camera movement in these dimensions, misidentified landmarks, changes in the physical landmarks in the environment, and the like. In one embodiment, these additional dimensions are advantageously used to test the validity of the identified landmark. In one embodiment, the Cartesian-coordinate relative pose is used between a visual front-end and a SLAM module when re-encountering landmarks, and a polar-coordinate "delta pose" is used in the SLAM module when computing change in pose between points measured by dead reckoning data.

In one embodiment, the pose of the robot according to dead reckoning sensor data as the robot travels in its environment is stored with a corresponding timestamp in a matrix. Retrieval of poses according to two points in time permits change in heading, direction traveled, and distance traveled to be computed between the two points in time.

Example of a System Architecture for VSLAM

FIG. 3 illustrates one embodiment of a system architecture for a VSLAM system 600. It will be understood that the VSLAM system 600 can be implemented in a variety of ways, such as by dedicated hardware, by software executed by a microprocessor, or by a combination of both dedicated hardware and software.

Inputs to the VSLAM system 600 include raw pose data 610 from one or more dead reckoning sensors 614 and also include visual data 612 from one or more cameras or other visual sensors 616. It will be understood that a dead reckoning sensor 614, such as an optical wheel encoder, can communicate with the VSLAM system 600 via a dead reckoning interface 618, such as via a driver or via a hardware abstraction layer. The raw pose data 610 can correspond to distance traveled, to velocity, to acceleration, and the like, and can depend on the type of dead reckoning sensor used. Outputs from the VSLAM system 600 can include one or more poses and maps 620.

The raw pose data 610 and the visual data 612 are provided as inputs to the Visual Front End 602. The Visual Front End 602 can perform a variety of functions, such as identify landmarks, identify 3-D features for landmarks, calculate delta pose, and the like. Examples of processes that can be performed by the Visual Front End 602 will be described in greater detail later in connection with FIG. 4.

The Visual Front End 602 can use the raw pose data 610 to determine the approximate distance traveled between the images in the visual data 612, which are then used in computations to measure the displacements to the features. When new physical landmarks are recognized, corresponding records or entries can be added to the landmark database 606. Newly recognized landmarks can also be indicated to the SLAM module 604. For example, a "new landmark" flag can be activated, and a "new landmark" identifier or tag can be provided to the SLAM module such that the appropriate records in a SLAM database 608 and the landmark database 606 can be matched. When previously recognized landmarks are encountered, the Visual Front End 602 can provide the SLAM module 604 or an optional Pre-Filter module 622 with one or more identifiers or tags to indicate the one or more landmarks encountered, relative pose information, such as relative pose information ($\Delta x$, $\Delta y$, and $\Delta \theta$), and data reliability measures as applicable.

The optional Pre-Filter module 622 analyzes the data reliability measures provided by the Visual Front End 602. The data reliability measures can be used as an indication of the reliability of the identification of the physical landmark by the Visual Front End 602. For example, the Pre-Filter module 622 can advantageously be used to identify a landmark measurement identified by the Visual Front End 602, which may have been inaccurately identified and can correspond to an outlier with respect to other landmarks in a map. In one embodiment, when the Pre-Filter module 622 identifies a potentially inaccurate visual measurement, the Pre-Filter module 622 does not pass the identified visual landmark data onto the SLAM module 604 such that the VSLAM system 600 effectively ignores the potentially inaccurate landmark measurement. Pre-filtering of data to the SLAM module 604 can advantageously enhance the robustness and accuracy of one or more poses (position and orientation) and maps 620 estimated by the SLAM module 604.

The SLAM module 604 maintains one or more poses and maps 620. In one embodiment, the SLAM module 604 maintains multiple particles or hypotheses, and each particle is associated with a pose and a map.

The SLAM module 604 receives the raw pose data 610 from the dead reckoning interface 618. It will be understood that the nature of the raw pose data 610 can vary according to the type of dead reckoning sensor 614 and the type of output specified by the dead reckoning interface 618. Examples of the raw pose data 610 can include distance measurements, velocity measurements, and acceleration measurements. The dead reckoning data is used by the SLAM module 604 to estimate course and distance traveled from a prior pose. It will be understood that where multiple hypotheses are used by the SLAM module 604, that the dead reckoning data is used to estimate course and distance traveled from relatively many prior poses.

Other inputs to the SLAM module 604 include visual localization data from the Visual Front End 602 and/or the optional Pre-Filter module 622. As a robot with VSLAM travels in an environment, the robot observes visual landmarks. When a new visual landmark is encountered, the SLAM module 604 can store the robot's global reference frame location for the particles in the SLAM database 608. For example, the robot's pose can be estimated from a previous location and the course and distance traveled from a last known pose.

When a previously created landmark is observed, the SLAM module 604 is provided with a new estimate of relative pose information, such as $\Delta x$, $\Delta y$, and $\Delta\theta$ to the observed landmark, from the Visual Front End 602 or the optional Pre-Filter module 622. The SLAM module 604 uses the change in pose information to update the one or more poses and maps 620 maintained. Accordingly, the visually observed landmarks can advantageously compensate for drift in dead reckoning measurements.

In the illustrated structure, a landmark is associated with a landmark tag or identifier I, a landmark pose estimate S, and an uncertainty measure, such as, for example, a covariance matrix C. Information describing the visual characteristics or image of the landmark, such as 3-D features, can be stored in a collection of data associated with the Visual Front End 602, such as in the landmark database 606. In a collection of data for the SLAM module 604, such as the SLAM database 608, a cross reference or database record identifier can be used to identify the landmark tag I.

It should be noted that the landmark pose S corresponds to the pose of the robot itself when the robot "creates" the landmark and adds the landmark to the map. In one embodiment, the landmark pose S can also be updated when the robot re-observes the landmark. In the illustrated structure, the landmark pose S corresponds to a 3×1 column vector with the contents of an x-dimension x for global reference, a y-dimension y for global reference, and a robot heading $\theta$ relative to the global reference frame. As noted earlier, the hypothetical pose and the corresponding map can advantageously vary among the particles of a multi-particle or multiple hypothesis SLAM system.

A covariance matrix C represents the uncertainty of the landmark pose S. The symbol $C_m^k$ will be used herein to denote the covariance matrix associated with landmark k for particle m. In one embodiment, the covariance matrix $C_m^k$ is updated with a Kalman filter.

It will be understood by one of ordinary skill in the art that a database can be implemented on an addressable storage medium and can be implemented using a variety of different types of addressable storage mediums. For example, the landmark database 606 and/or the SLAM database 608 can be entirely contained in a single device or can be spread over several devices, computers, or servers in a network. The landmark database 606 and/or SLAM database 608 can be implemented in such devices as memory chips, hard drives, optical drives, and the like. Though the data structure shown has the form of a relational database, one of ordinary skill in the art will recognize that the database may also be, by way of example, an object-oriented database, a hierarchical database, a lightweight directory access protocol (LDAP) directory, an object-oriented-relational database, and the like. The databases may conform to any database standard, or may even conform to a non-standard, private specification. The database can also be implemented utilizing any number of commercially available database products such as, by way of example, Oracle® from Oracle Corporation, SQL Server and Access from Microsoft Corporation, Sybase® from Sybase, Incorporated and the like.

The data structures shown utilize a relational database management system (RDBMS). In a RDBMS, the data is stored in the form of tables. Conceptually, data within the table is stored within fields, which are arranged into columns and rows. Each field contains one item of information. Each column within a table is identified by its column name and contains one type of information, such as a value for a SIFT feature.

Management of Databases

It will be understood by the skilled practitioner that the size of the databases holding the various maps for the particles can grow over time as landmarks are accumulated in the maps. One embodiment of the invention also include techniques for managing the databases.

The landmark database 606 and the SLAM database 608 can be managed to provide efficient performance of VSLAM processing in a diverse variety of settings and to manage the amount of memory used in VSLAM processing. One way to efficiently manage the databases is to remove landmarks from the databases that are perceived to be no longer present in the environment or can otherwise be considered unreliable, bad, or in any other way undesired.

For example, the assessment that a physical landmark has disappeared from the environment such that the corresponding landmark should be removed from the databases can be based on repeatedly not observing the physical landmark at or near poses where it is expected to be observed.

In another example, measurements that repetitively correspond to outliers, i.e., relatively extreme measurements, can also be considered to be unreliable and can be removed from the databases. For example, a landmark can be considered to be unreliable or bad if measurements of the landmark over time have been repeatedly inconsistent or otherwise indicated as unreliable. An example of a range for repeatedly inconsistent measurements is about 5 to 10 inconsistent measurements. Other appropriate values will be readily determined by one of ordinary skill in the art. In one embodiment, a measurement for a landmark is inconsistent if the measurement suggests that the robot is located relatively far away from where a relatively large proportion of the particles, such as about 90%, the SLAM subsystem predicts the robot to be. In one embodiment, the robot is determined to be located relatively far away when the SLAM prediction prior to incorporation of the new visual measurement into an estimate falls outside a 95% confidence ellipse. In one embodiment, the 95% confidence ellipse has (i) the visual measurement estimate of robot pose as its mean, and (ii) $C_{sensor}$ as its covariance matrix. In another embodiment, the robot can be determined to be located relatively far away when the difference between the pose estimated by SLAM and the pose estimated by the visual measurement exceed a predetermined threshold. An example of an appropriate value for a predetermined threshold in an indoor environment is about 2 meters. Other values will be readily determined by one of ordinary skill in the art. It should be noted that while "repeatedly inconsistent" measurements for a landmark can indicate that the landmark is unreliable, an occasionally inconsistent measurement may or may not indicate that the landmark is unreliable, but rather, such occasionally inconsistent measurements may be the result of collisions of the robot with another object, a "kidnapping" of the robot, such as by lifting and moving the robot from one spot to another, and the like. In one embodiment, such occasionally inconsistent measurements do not result in a deletion of the landmark from the databases.

In another example, landmarks can be considered undesirable when, for example, it is determined that the density of landmarks in some parts of the map is relatively high, such as about 5-10 landmarks per square meter for an indoor environment. It will be understood that the density of landmarks can vary considerably from one environment to another and that correspondingly, appropriate thresholds for "high" density will also vary and will be readily determined by the skilled practitioner. By selectively removing some of the landmarks in a too dense portion of the map, memory can be freed for other tasks.

In one embodiment, a memory management technique can be used when the landmark database has grown to a relatively large size. Typically, a mass storage device such as a hard disk is relatively slow compared to a solid-state memory device, such as random access memory (RAM). Conversely, a mass-storage device typically has much more storage capacity than a solid-state memory device. Alternatively, a solid-state memory device, such as, for example, a flash memory or an EEPROM device, can be used to store a landmark database in a non-volatile manner. Memory usage can be efficiently managed by maintaining only a relatively small fraction of the total landmark database in the relatively fast memory, such as the RAM, at a time. For example, a few initial landmark measurements and comparisons with the landmark database can typically reveal approximately where the robot is likely to be operating in a mapped environment. For example, an entire house, office, or hospital floor can be mapped as the environment; and after a few initial measurements, the VSLAM system 600 can determine that the robot is in a particular room in a house, on the first floor of an office, in a particular wing of a hospital, and the like.

To reduce the consumption of memory resources, at least partly in response to the determination of the approximate location of the robot, the VSLAM system 600 can then maintain a relatively small subset of the database in RAM that contains the relevant portion of the database, and other previously used memory resources can be released back to the system. Should, for example, a relatively long period of time transpire without successful matches with the loaded subset of the database, the entire map can again be loaded temporarily to determine if the robot has been moved or has moved to another part of the environment. For example, the robot may have traveled autonomously or may have been picked up and moved to a new location.

In one embodiment, the subset of the map that is maintained in relatively fast memory such as RAM can at least temporarily correspond to a randomly selected subset of the plurality of landmarks from the map. In another embodiment, the subset of the map that is maintained in relatively fast memory can at least temporarily correspond to a subset that is selected such that the density of landmarks remaining in the subset is relatively uniformly distributed throughout the map. These techniques can advantageously be used, for example, to assist a mobile robot with relatively limited memory resources and/or computational resources to localize itself within one or more maps.

In one embodiment, the VSLAM system advantageously discontinues adding new landmarks to the database. In one example, the VSLAM system discontinues landmark creation in a portion of an environment or in the entire environment at least partly in response to a determination that the landmark density has exceeded a predetermined threshold, such as 5-10 landmarks per square meter. For example, when a database for an environment exhibits relatively high landmark density in one portion of the environment and a relatively low landmark density in another portion of the environment, the addition of new landmarks to the database can be disabled for the portion of the environment corresponding to the relatively high landmark density in the database, and the addition of new landmarks can be enabled for portions of the environment corresponding to the relatively low landmark density.

In one embodiment, the VSLAM system discontinues adding new landmarks to the database at least partly in response to a landmark creation decay rate, i.e., a determination that over a period of time, fewer and fewer new landmarks are being identified. The measurement of the landmark creation decay rate can be applied to parts of an environment or to the entire environment. For example, in a relatively static environment under relatively constant lighting conditions, the rate at which landmarks are created will typically be highest in the beginning, before many landmarks have been created. After the area has been partially mapped by the creation of landmarks, i.e., the addition of landmarks to the database, the visual front end less frequently attempts to create landmarks. In one embodiment, a creation rate corresponds to the number of landmarks created per meter of travel. When the creation rate in a given part of the environment has dropped below a threshold, which can correspond to for example, (i) a predetermined value such as 1 landmark every 10 meters, or can correspond to (ii) a percentage of the initial creation rate such as 5% of the rate (per unit of distance traveled) obtained during the first passage through the relevant part of the environment, then landmark creation can be temporarily discontinued in that part of the environment.

In another embodiment, the VSLAM system discontinues adding new landmarks to the database for all or part of the environment at least partly in response to a ratio of visual measurements to landmarks created. In another embodiment, the discontinuing of adding landmarks can also be triggered at least partly in response to elapsed time, such as after 30 minutes of mapping, or at least partly in response to memory usage, such as when 75% of the memory has been used for the landmark database.

SLAM Graph Structure

Figure 4:
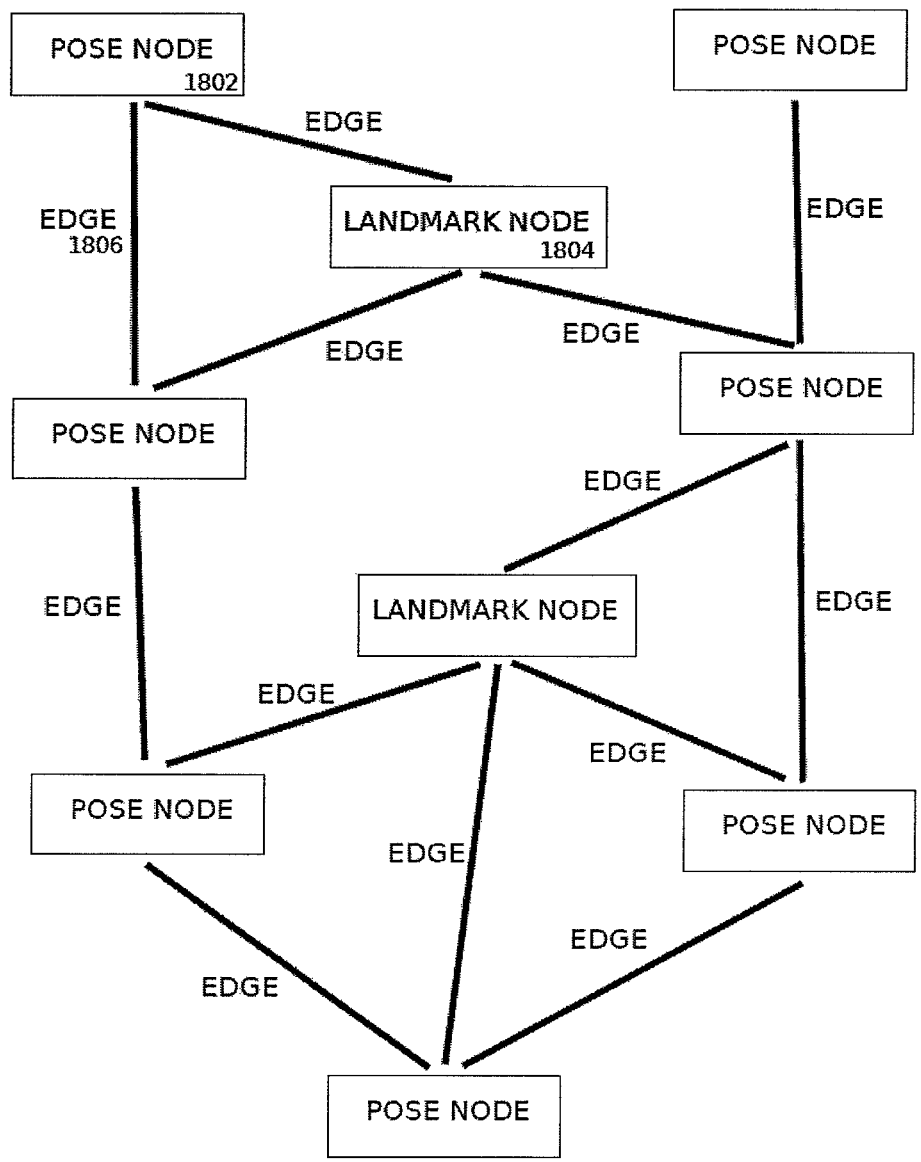
FIG. 4 illustrates a SLAM graph representing landmark pose nodes and other pose nodes of a robot.

FIG. 4 provides an example of how certain of the present embodiments represent landmarks and other poses of the robot in a graph structure, referred to herein as a SLAM graph. As the terms are used herein, pose nodes may be classified as either "normal" pose nodes 1802 or "landmark" pose nodes 1804. Landmark pose nodes 1804 identify a pose node with a landmark associated with the node. "Normal"

pose nodes 1802 in contrast, indicate only the robot's pose. As illustrated in FIG. 4 a plurality of pose nodes 1802, 1804 are connected by a plurality of edges 1806. Adjusting the SLAM graph in real-time to more optimally represent the past observations will facilitate more efficient navigation.

Each pose node 1802 in the SLAM graph, whether a "normal" or "landmark" pose node, encodes the estimated pose of the robot at a particular time step of operation. Each oriented edge 1806 encodes an estimate of the transformation between the coordinate frame of the source graph node and the destination graph node. The SLAM graph may be constructed and refined incrementally during operation, that is, in real-time.

Figure 5:
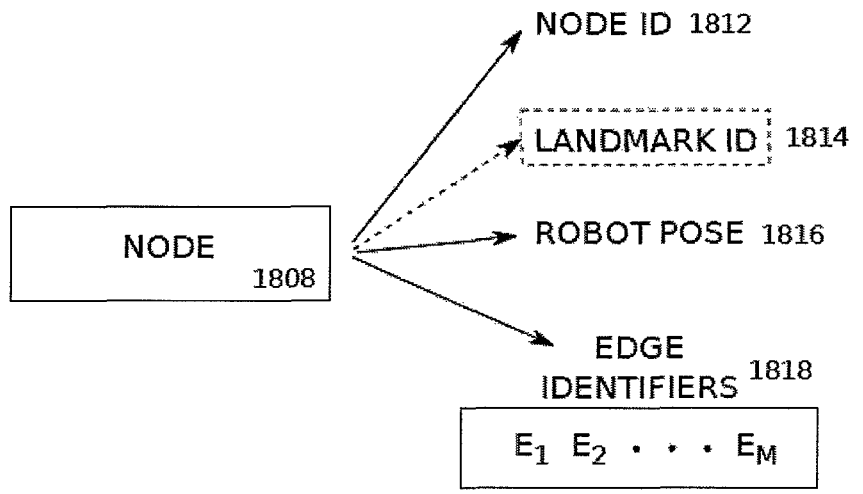
FIG. 5 illustrates various information associated with the nodes and edges of the SLAM graph.
Figure 5:
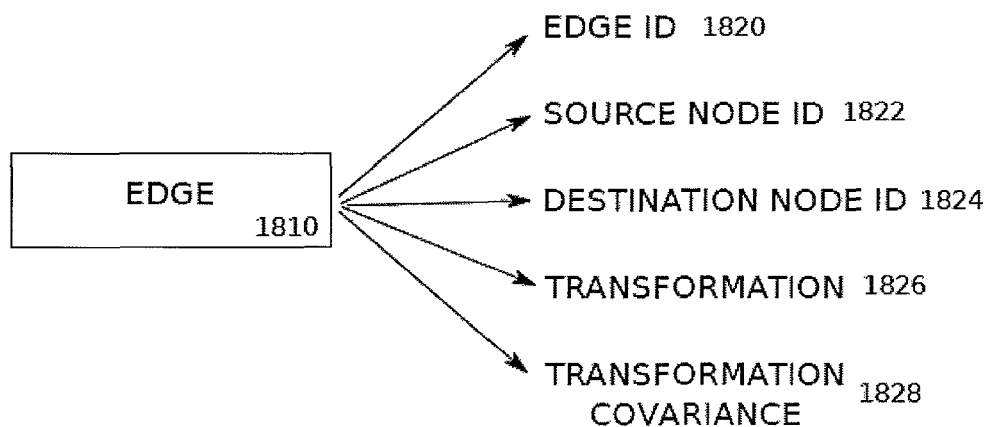

FIG. 5 shows the information associated with nodes and edges in the SLAM graph in certain embodiments in greater detail. Each edge 1810 includes a unique identifier 1820, and the identifier of its source node 1822 and its destination node 1824. In one embodiment of the invention, the transformation from source to destination is encoded as a Gaussian random vector which is represented by its mean 1826 and covariance 1828 over the coordinate transformation parameters. In other embodiments, the a distribution different from Gaussian could be used and it can be represented by sample particles or in a parametric form. In other embodiments, a deterministic formulation can be used where only the mean value is stored in the edge data structure. The contents of a pose or landmark node are shown in further detail in 1808. Each node has a unique identifier 1812, a robot pose estimate 1816, and a list of edge identifiers 1818 that enumerates the edges incident to the node in the SLAM graph. If the node is a landmark node, it may also encode the unique identifier 1814 of the landmark associated with the node Like edge transformations, also pose estimated can be represented as a random variable or a deterministic parameter. In a case of a random variable, either a parametric or a numerical sample could be used to represent the distribution. In one embodiment, a Gaussian distribution is used and the parameters are the mean vector and the covariance matrix. Nodes and edges may be accessed via each of the unique identifiers 1812, 1820. The structures depicted in FIG. 5 are merely provided by way of example and one will readily recognize a plurality of alternative representations.

Visual Front End Processing for Landmark Creation (New Landmarks)

Figure 6:
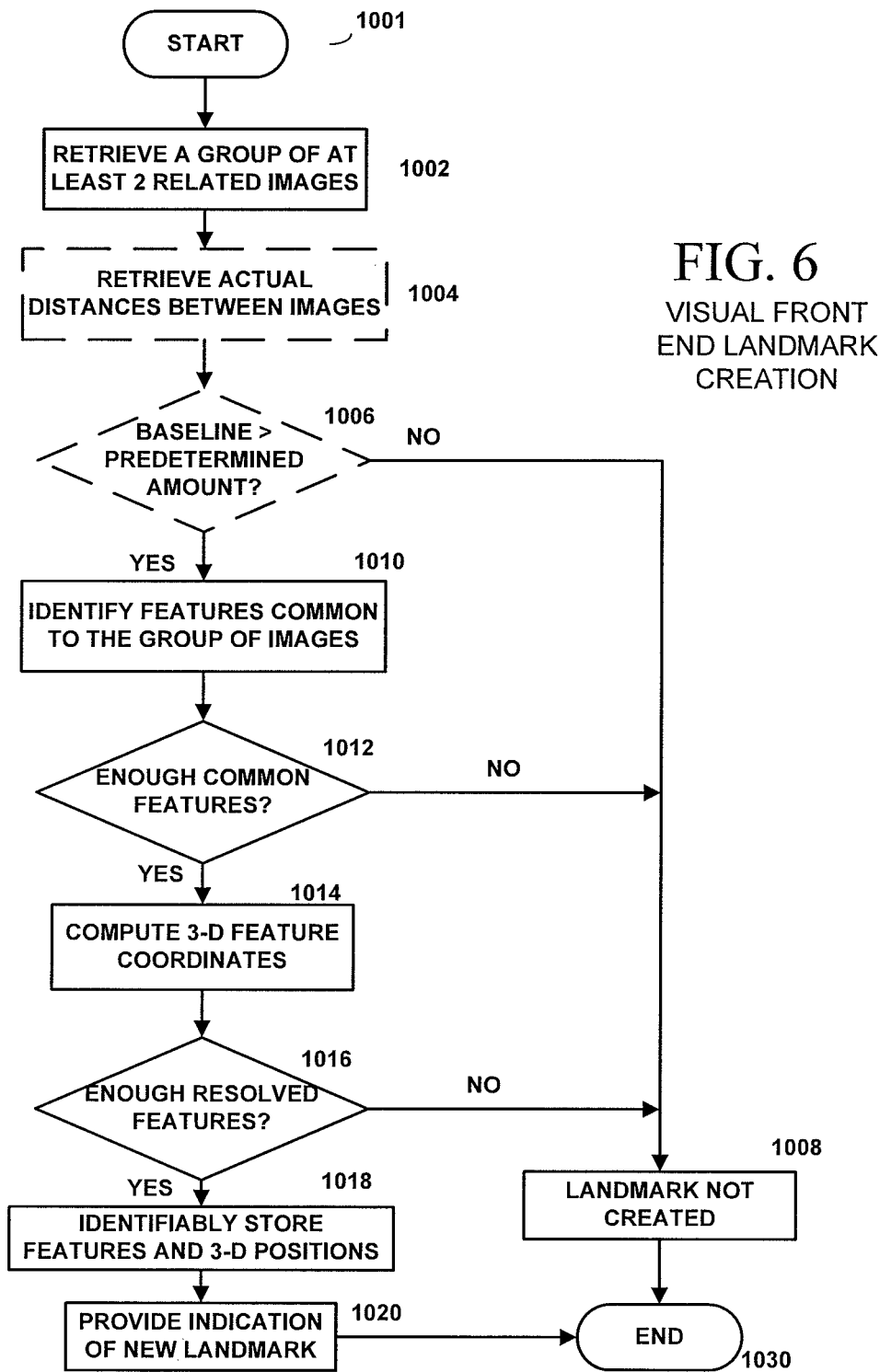
FIG. 6 is a flowchart of a process useful in a visual front end for creating a new landmark.

FIG. 6 is a flowchart generally illustrating a process that can be used in a visual front end when recognizing a new physical landmark in the environment and creating a corresponding landmark in one or more maps in a database. The act of creating a new landmark may also be referred to as "generating" a landmark. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. In addition, it should be noted that the process can be performed in a variety of ways, such as by software executing in a general-purpose computer, by firmware executed by a microprocessor, by dedicated hardware, and the like.

The process begins at a state 1002, where the process retrieves a group of at least 2 images for analysis. For example, the images can be provided by a visual sensor with multiple images, such as a binocular or trinocular camera, or by a visual sensor with a single imager, such as from a single camera. When images from a single camera are used, the process can select images that are appropriately spaced apart. In the illustrated embodiment, the robot is equipped with a single forward-looking camera and travels forward to take related images. Other configurations for the visual sensor are also possible. In other examples, the visual sensor can correspond to a generally upward-pointing camera, to a sideways-looking camera, or to positions between forward looking, upward, and/or sideways. Returning now to the illustrated embodiment with a single forward-looking camera, in one example, three images are selected at a separation distance of at least about 10 centimeters (cm) apart. It will be understood that an appropriate distance for the separation distance can vary in a broad range depending on the environment. For example, where the operating environment corresponds to a relatively expansive environment, such as to an outdoor environment, the appropriate distance for separation between images can be higher in order to gain perspective on the features. In one embodiment, the separation distance can be adaptively varied in response to an estimate of the proximity of obstacles that can obstruct the motion of the robot. In one embodiment, where the robot is equipped with a single forward-looking camera, the robot moves in an approximately straight line in the forward direction while taking the images. Although some turning can be tolerated while the robot is taking images, the turning should not be so excessive such that the features of the landmarks are no longer in the view of the camera. The process advances from the state 1002 to an optional state 1004.

The state 1004 and a decision block 1006 can be optional depending on the configuration of the robot. Where the robot is equipped with a visual sensor with multiple imagers, such as a trinocular camera, the state 1004 and the decision block 1006 can be skipped, and the spacing between the visual sensors can be retrieved from a stored parameter in memory. When skipped, the process advances from the state 1002 to a state 1010.

When a single camera is used as the visual sensor, and the robot moves to take different images from different perspectives, the process retrieves the actual distances between images in the state 1004 and checks the amount of movement in the decision block 1006. In one embodiment, these distances are determined by monitoring the dead reckoning data corresponding to the times at which the images were taken. The process advances from the state 1004 to the decision block 1006.

In the decision block 1006, the process tests the distance traveled between images, termed "baseline." For example, the amount of baseline between images can be compared to a predetermined value. It will be understood that the predetermined value can vary in a very broad range. In an indoor environment, such as the interior of a home or apartment, an appropriate value can be about 10 centimeters for the predetermined value. Of course, the appropriate value can depend on the environment, and other appropriate values will be readily determined by one of ordinary skill in the art. When the movement of the robot is not sufficient between one or more of the images in the group, the process proceeds to a state 1008, and the process does not create a landmark. Otherwise, the process proceeds from the decision block to the state 1010.

In the state 1010, the process analyzes the selected images to identify 2-D features that are common to the images in the group. The number of features that are observable will vary according to the environment. The extraction of suitable features has been extensively described in the literature. SIFT features are one example of such 2-D features. See, for example, David G. Lowe, *Local Feature View Clustering for 3D Object Recognition* Proceedings of the IEEE Conference on Computer Vision and Pattern Recognition, Kauai, Hi. (December 2001). It should be noted that other information used in the calculation of the features can include intrinsic camera calibration parameters and extrinsic camera parameters. Examples of intrinsic camera calibration parameters include optical center, distortion parameters, and focal length. Examples of extrinsic camera calibration parameters include a camera-rigid transformation between the camera reference frame and the local reference frame. The process advances from the state 1010 to a decision block 1012.

In the decision block 1012, the process determines whether enough features have been identified that are common to the images in the group, e.g., the three images, for reliable identification of the landmark. When, for example, the process determines that fewer than a predetermined number of features are common to the images in the group, the process can determine that there are not enough features detected to reliably identify the landmark in the future. In this case, the process can proceed from the decision block 1012 to the state 1008, and the process does not "create" a landmark. It will be understood that an appropriate value for the predetermined number of features can vary in a very broad range and can depend on the method used to identify visual features. In one embodiment, the predetermined number of features is higher for the decision block 1012 for landmark creation than a predetermined value used to compare an image to an already stored landmark.

In one embodiment, where SIFT features are used, an example of a sample value for the predetermined number of features is about 10. Other suitable values will be readily determined by one of ordinary skill in the art. In one embodiment, the VSLAM system 600 can be configured to permit predetermined values to be user configurable. The process proceeds from the decision block 1012 to a state 1014 when enough features common to the images in the group have been identified.

In the state 1014, the process computes 3-D local reference frame positions or displacements to the common features identified in the state 1010. In one embodiment, the 3-D local reference frame positions correspond to the approximate 3-D position (x, y, z) of a feature relative to the visual sensor of the robot. Where multiple images are taken from a single visual sensor as the robot moves, the 3-D local reference frame positions can be relative to the position of the robot when the robot took one of the images in the group, such as the first image in the group. In one example, the computations for the 3-D positions are resolved by solving the structure and motion problem using the trifocal tensor method. It will be understood that the features can occupy a space larger than a point, such that the correspond 3-D positions can be relatively approximate. The process advances from the state 1014 to a decision block 1016.

In the decision block 1016, the process determines whether there have been enough 3-D local reference frame positions for features resolved in the state 1014 for the landmark to be reliably recognized. It will be understood that occasionally, the process may not find a solution to the 3-D local reference frame positions for a particular feature such that the number of 3-D features with corresponding displacement information can be different than the number of such initially-detected features. For example, in the decision block 1016, the process can compare a count of the 3-D local reference frame positions resolved for features of a landmark to a predetermined number. In one embodiment, where SIFT features are used, the process determines that a landmark has a sufficient number of features with 3-D local reference frame positions resolved for relatively reliable recognition when there have been 10 or more such features resolved. Other appropriate values will be readily determined by one of ordinary skill in the art. The process proceeds from the decision block 1016 to a state 1018 when the landmark has been determined to be reliably recognized. Otherwise, the process proceeds from the decision block 1016 to the state 1008, and the process does not "create" a landmark.

In the state 1018, the process identifiably stores the features, the 3-D positions, and, optionally, the approximate 2-D image locations corresponding to the features for the image that is used as the reference. For example, the 3-D position and the 2-D image location for a feature can be stored in a record in a feature table. It will be understood that each landmark that is created should have a unique reference, such as a unique numbered identifier, and that each feature of a reference should also be identifiable, such as by a combination of the reference for the landmark, e.g., Landmark ID, and the reference for the feature, e.g., Feature ID. The process advances from the state 1018 to a state 1020.

In the state 1020, the process provides an indication that a new landmark has been created to other processes, such as processes related to the SLAM portion of VSLAM. For example, the indication can be provided as a parameter or flag in a software call, a hardware or a software interrupt, and the like. The indication can also be accompanied by the landmark identifier for the newly created landmark.

Overview of Various Embodiments

Present embodiments disclose various improvements to the front-end and to the back-end of a SLAM-based mobile platform navigation system. One will readily understand that the "front-end" refers to operations involved in generating landmarks, or recognizing landmarks in the graph, while "back-end" refers to operations concerning maintenance and upkeep of the SLAM graph. The division between "front-end" and "back-end" operations is merely for conceptual convenience and one will readily recognize that certain operations may occur across this artificial division. With regard to the front-end, present embodiments disclose a novel feature matching methodology wherein a global database is searched in conjunction with a local database of features. These embodiments are particularly discussed in relation to FIG. 8. Additionally, still with regard to the front-end, certain embodiments disclose a robust matching and estimation landmark creation process. These embodiments are particularly discussed in relation to FIG. 10. With regard to the back-end, certain embodiments contemplate methods for improved optimization and management of the SLAM graph so as to improve memory usage and operational efficiency of the SLAM-based system. These embodiments are particularly discussed in relation to FIGS. 15-18. Although these particular improvements to the front and back-ends have been identified one will also find numerous additional concepts disclosed herein conducive to improved SLAM-based navigation.

The following definitions are to be considered in view of the glossary of terms provided above, as the glossary provides particular examples of the general meaning associated with the following terms. In the present disclosure, a "mobile system" is a broad term and is to be given its ordinary and customary meaning to a person of ordinary skill in the art (i.e., it is not to be limited to a special or customized meaning) and includes, without limitation, any electronic system which may be moved, such as a robot, handheld electronic device, accessory to a vehicle and the like. Such a system may move under its own control, as in the example of a robot, while other systems may be moved by a user, such as in the example of a handheld device. Similarly, in the present disclosure, a "trajectory" is a broad term and is to be given its ordinary and customary meaning to a person of ordinary skill in the art (i.e., it is not to be limited to a special or customized meaning) and includes, without limitation, any path upon which an object is to travel. For example, a robot may use a trajectory as the path between two waypoints across a terrain. Similarly, in the present disclosure, a "pose node" is a broad term and is to be given its ordinary and customary meaning to a person of ordinary skill in the art (i.e., it is not to be limited to a special or customized meaning) and includes, without limitation, any data structure sufficient to store pose information for a mobile system. A "landmark node" will be understood as a pose node which is designated, either by an internal identifier or an external identifier, as comprising information related to a landmark. Similarly, in the present disclosure, a "landmark" is a broad term and is to be given its ordinary and customary meaning to a person of ordinary skill in the art (i.e., it is not to be limited to a special or customized meaning) and includes, without limitation, any object, feature, or aspect found in a terrain which a system may subsequently identify. Similarly, in the present disclosure, a "threshold" is a broad term and is to be given its ordinary and customary meaning to a person of ordinary skill in the art (i.e., it is not to be limited to a special or customized meaning) and includes, without limitation, any numerical value or condition which may be used as a basis for determining whether to perform an action. Similarly, in the present disclosure, "identifying a pose node" is a broad term and is to be given its ordinary and customary meaning to a person of ordinary skill in the art (i.e., it is not to be limited to a special or customized meaning) and includes, without limitation, any operation used to select a pose node from a plurality of pose nodes. Similarly, in the present disclosure, "removing a pose node" is a broad term and is to be given its ordinary and customary meaning to a person of ordinary skill in the art (i.e., it is not to be limited to a special or customized meaning) and includes, without limitation, any operation which modifies a graph so that the graph no longer references a pose node, or which initiates one or more operations so that the graph will no longer reference a pose node. Similarly, in the present disclosure, "inserting a pose node" is a broad term and is to be given its ordinary and customary meaning to a person of ordinary skill in the art (i.e., it is not to be limited to a special or customized meaning) and includes, without limitation, any operation which modifies a graph so that the graph references the pose node, or which initiates one or more operations which will result in the graph referencing the pose node.

Similarly, in the present disclosure, "camera" is a broad term and is to be given its ordinary and customary meaning to a person of ordinary skill in the art (i.e., it is not to be limited to a special or customized meaning) and includes, without limitation, any device capable of capturing an image. Similarly, in the present disclosure, "navigation system" is a broad term and is to be given its ordinary and customary meaning to a person of ordinary skill in the art (i.e., it is not to be limited to a special or customized meaning) and includes, without limitation, any software, hardware, or firmware module configured to perform certain of the operations disclosed herein. For example, a laptop, or any mobile computer system, comprising software instructions to maintain a SLAM graph and to perform one or more of the operations depicted in FIGS. 16-18 would comprise a navigation system. Similarly, in the present disclosure, "planner" is a broad term and is to be given its ordinary and customary meaning to a person of ordinary skill in the art (i.e., it is not to be limited to a special or customized meaning) and includes, without limitation, any software, hardware, or firmware module configured to operate various actuators, such as servos, motors, or pistons so as to move a mobile electronic system from a first location to a second location.

SLAM Front End Processing

With regard to embodiments directed to improvements in the visual front end processing, certain of the present embodiments contemplate a landmark creation module possessing novel feature matching, structure and motion estimation functionality. This module comprises novel criterion for performing the landmark creation process discussed above in relation to FIG. 6. Present embodiments may similarly follow part or all of the FIG. 6 flowchart.

In the present embodiments of the landmark creation process, the landmark creation process may need only two distinct views of a scene as input 1002 (in contrast to the three distinct views discussed in certain embodiments above). The inter-frame matching procedure 1010 may use both feature appearance and epipolar geometry constraints, improved by estimates from dead reckoning sensors when these are available. The structure estimation 1014 may be performed using optimization to enforce the epipolar geometry constraints and only the visual measurements, yielding a relative pose estimate with an associated covariance matrix. The validity check 1016 may require not only a certain number of resolved features, but also a degree of statistical certainty in the estimation of direction of motion, which may be related to the strength and/or numerical conditioning of the structure estimation operation. This stronger check at 1016 allows the baseline check at 1006 to be relaxed with respect to the previous embodiment, permitting a greater range of viable image pairs for landmark creation. Each of these processes is described in greater detail below.

Figure 7:
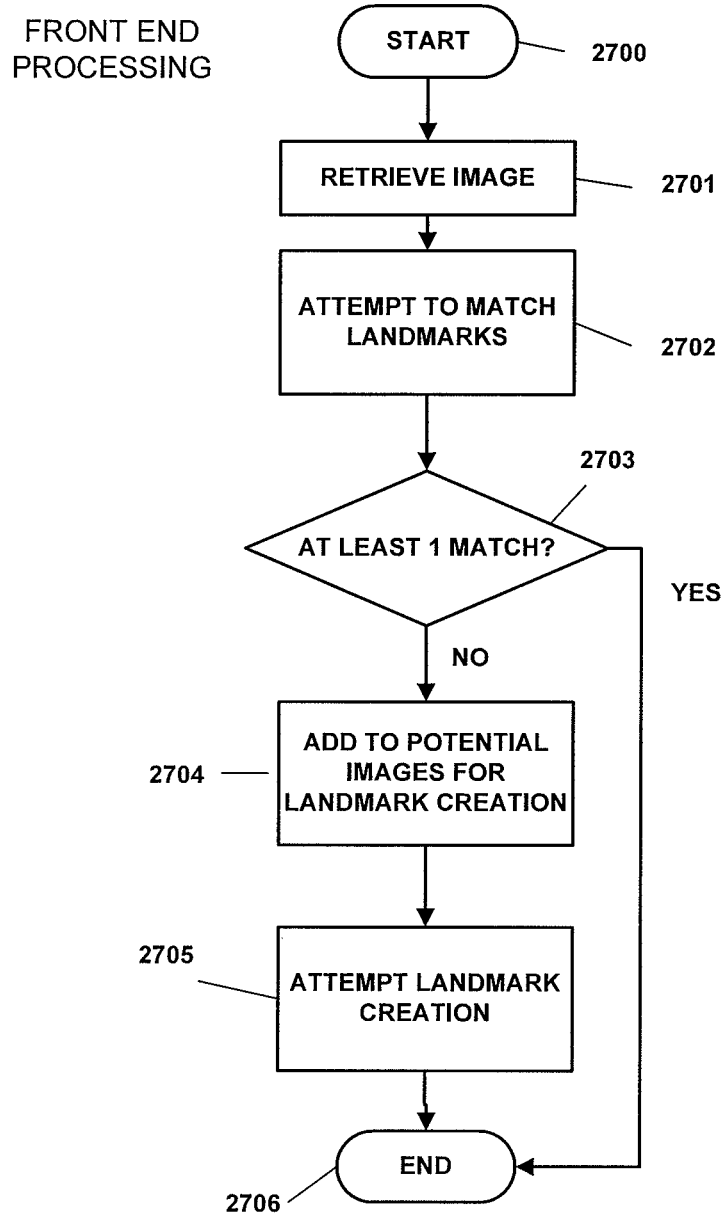
FIG. 7 is a flowchart illustrating an overview of the front-end processing described in certain embodiments.

FIG. 7 depicts a general overview of the visual front end process for creating a new landmark or identifying a previous landmark implemented in certain embodiments. The process may begin at state 2701 by retrieving an image, such as an image from a camera. At state 2702 the system may attempt to match landmarks. In one embodiment this is performed by matching a set of visual features extracted from the retrieved image against a database of visual features from all the generated landmarks. At decision block 2703 the system may determine if at least one landmark matched the retrieved image. If at least one match exists, the system may end 2706. If there are no matches the system may instead proceed to state 2704 and add the image to a list of potential images for landmark creation. The system may then proceed to the state 2705 and attempt landmark creation from the list of accumulated images.

Landmark Recognition

Figure 8:
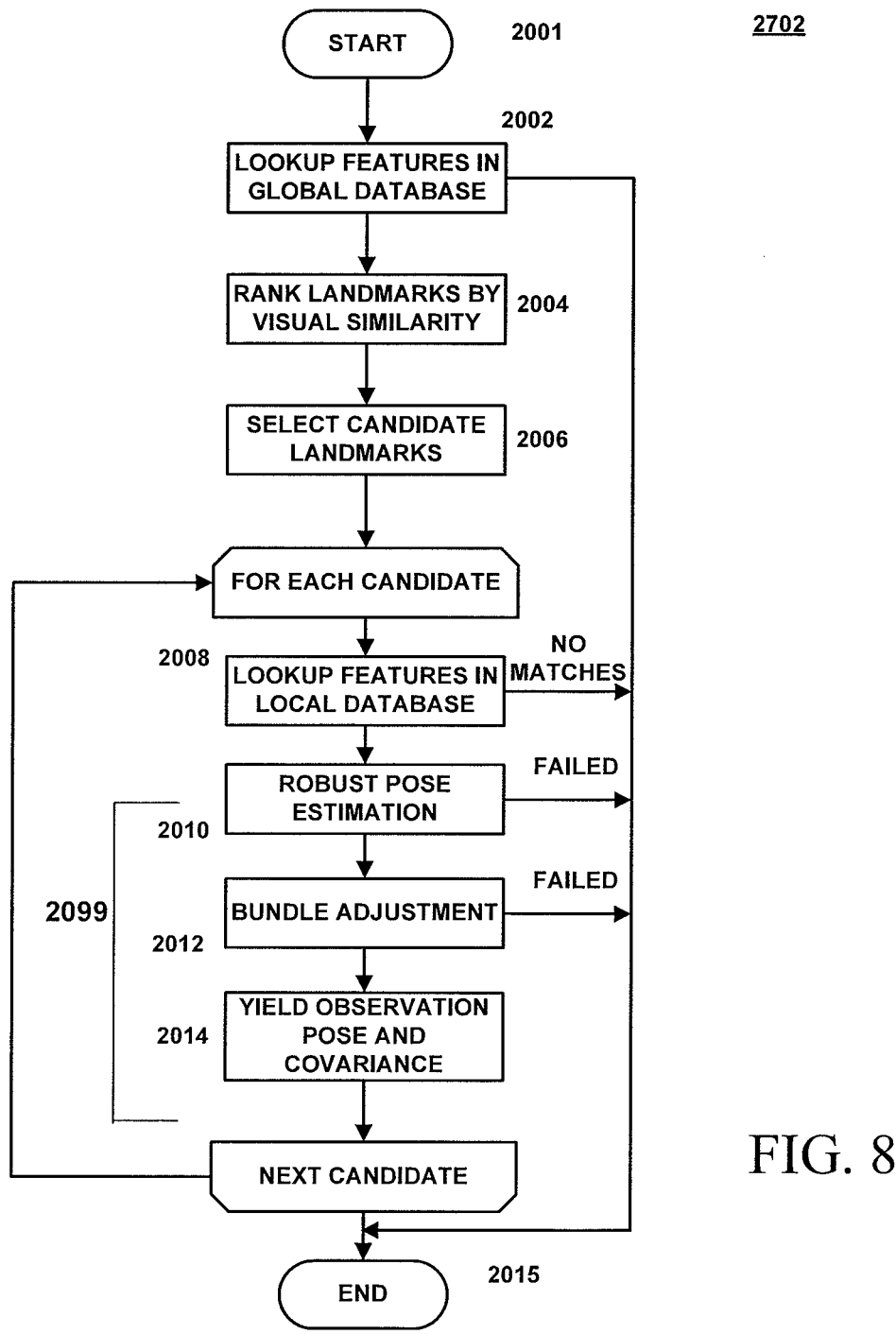
FIG. 8 is a flowchart elaborating on state 2702 of the flowchart of FIG. 7, i.e. upon the landmark matching process implemented in certain embodiments.

FIG. 8 is shows the landmark recognition process implemented in certain embodiments. Particularly, FIG. 8's flowchart elaborates on state 2702 of the flowchart of FIG. 7, i.e. upon the landmark matching process implemented in certain embodiments. This process may be executed for each captured image during operation. In these embodiments, features may be matched using a coarse to fine strategy. This reduces processing effort while attempting to maximize the number of matched features found.

The process begins at state 2002 where the system looks up features in the query image from a global database to find candidate landmarks. One will understand the global database to comprise a database containing features from all the previously identified landmarks. Such a database may be stored on a mobile device performing the described operations or may be located remotely, such as on a server. Consequently, to look up features in a global database indicates finding features in the global database that are visually similar to the ones from the query image. Visual similarity can be determined by a number of well known methods. For example, SIFT descriptors may be used as described above.

These features may then be used to establish a ranking by visual similarity in state 2004. From this ranking, promising landmark candidates may be selected in state 2006.

A more granular matching is then performed against the set of features in each candidate landmark using a local database. Here, one will understand a "local" database to refer to look up among features from a current landmark. The system then iterates through all the candidates, performing local matching against each candidate in 2008-2014, potentially yielding observations. Local matching may comprise looking up the query image features in a database that only contains features from the current candidate landmark. Particularly, in each iteration the system may look up features in state 2008, perform robust pose estimation in state 2010, perform bundle adjustment in state 2012, and yield observation pose and covariance in state 2014. One will recognize that there are many methods to estimate pose given image feature locations and the 3D structure of those features. Some of these are discussed above in regard to FIGS. 2C and 2D. A description of bundle adjustment may be found in Bill Triggs, P. McLauchlan, Richard Hartley, and A. Fitzgibbon. Bundle adjustment—a modern synthesis. In B. Triggs, A. Zisserman, and R Szeliski, editors, *Vision Algorithms: Theory and Practice, volume* 1883 *of Lecture Notes in Computer Science*, pages 298-372. Springer-Verlag, 2000.

One will further recognize that the covariance is the accuracy of the estimated relative pose.

A successfully recognized landmark is determined via observation at state 2014 which consists of a mean and covariance of the relative camera pose between the landmark coordinate frame and the query image. As indicated in FIG. 8 the system may fail to reach this state by a number of routes. For example, at state 2008, if there were no similar features in the database the feature lookups would have failed. In state 2010, the robust pose estimation can fail to find a pose. Similarly, in state 2012, the bundle adjustment can fail if the reprojection error is too high.

Landmark Creation Via Robust Inter-Frame Matching

Figure 9:
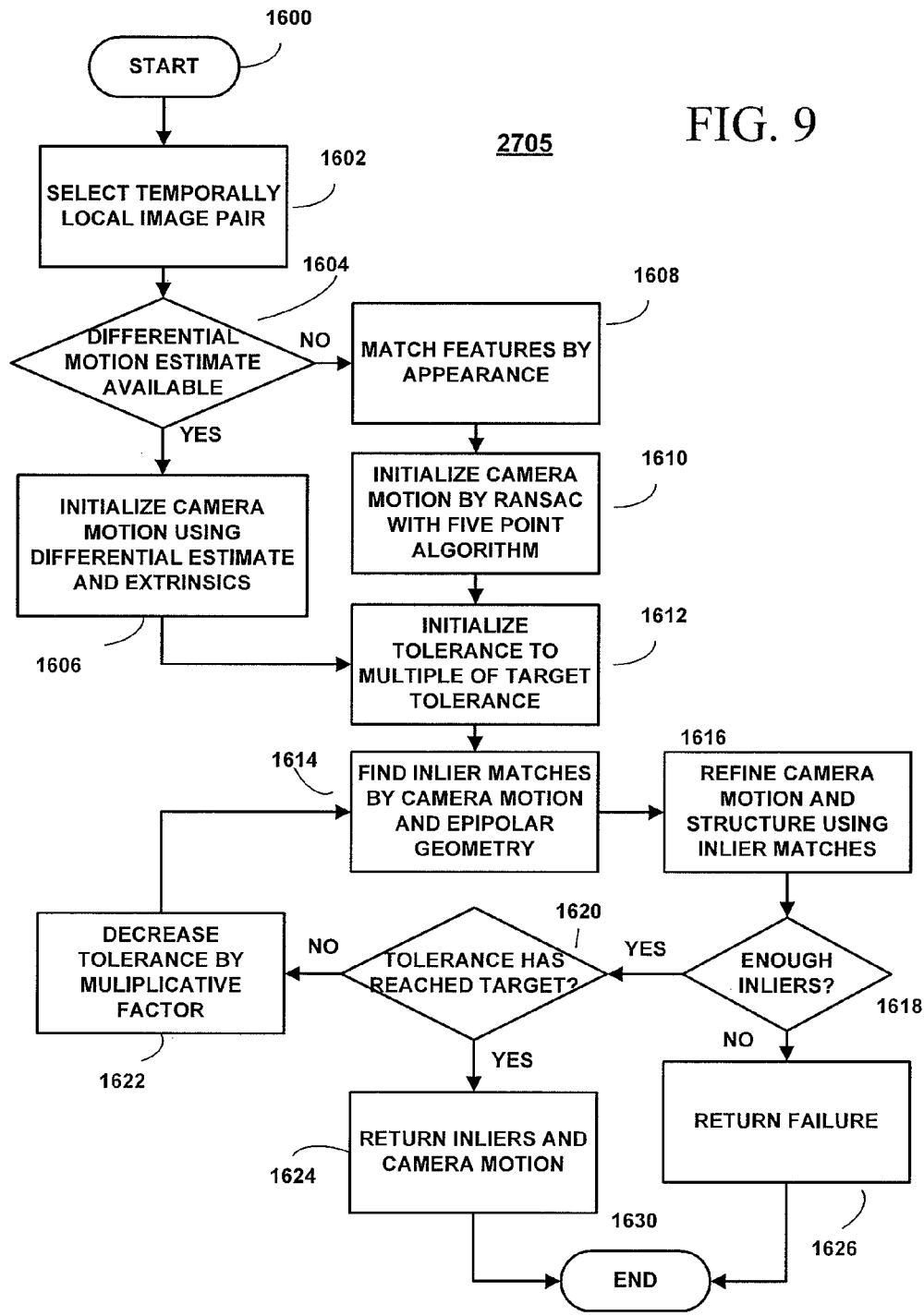
FIG. 9 is a flowchart elaborating on state 2705 of FIG. 7, i.e. upon one embodiment of the landmark creation process.

FIG. 9 is a flowchart elaborating on state 2705 of FIG. 7, i.e. upon one embodiment of the landmark creation process. Generally speaking, the procedure first establishes putative (candidate) correspondences, and then partitions these correspondences into inlier (correct) and outlier (incorrect) correspondences using geometric constraints. A correspondence comprises a pair of matching features consisting of a feature in one image and the corresponding feature in the other image. The geometric constraints may similarly comprise the constraints on the structure of the points from the camera projection model. The process may begin 1600 at state 1602 by selecting a temporally local image pair, i.e. a pair of images captured closely in time. With a single camera, this pair may comprise successive or nearly successive images. With a stereoscopic system, this may comprise a stereoscopic image pair. The frames in this image pair are referred to as Frames A and B respectively herein.

The system may then proceed to decision block 1604 and determine if a differential estimate is available. Differential estimates comprise motion estimates of motion from one instant to the next such as those provided by odometry or a gyro. Putative correspondences may be generated at decision block 1604, either by using only the feature descriptors, or by taking advantage of any dead reckoning robot motion estimates supplied by other sensors. The term "putative correspondence" as used herein refers to the initial draft list of possible correspondences. Where only feature descriptors are used, each feature in frame B may be first paired with the feature in frame A according to distance in the feature descriptor space 1608. An approximate nearest neighbors (ANN) method may be used to identify mutually corresponding pairs at state 1608. If both sets of features have sufficiently small cardinality, exact nearest neighbors may be determined. For large sets, approximate nearest neighbors may be used as exact nearest neighbors may be computationally expensive. For small sets, however, this may not be a problem. Given a set of putative correspondences, epipolar geometric constraints may be applied iteratively to eliminate outliers. When no prior on camera motion is provided, a starting point for the procedure may be computed at 1610 using Random Sample Consensus (RANSAC) and the five point algorithm. One will readily recognize alternative algorithms which may be used to initialize the relative pose of the cameras and the structure of the points. RANSAC provides a robust solution, but alternatives need not be similar to RANSAC. The five point algorithm is discussed in greater detail in David Nister, An efficient solution to the five-point relative pose problem. *IEEE Transactions on Pattern Analysis and Machine Intelligence* (*PAMI*), 26(6):756-777, June 2004. This yields an estimate of camera motion (without scale) and a set of inlier correspondences. When a prior dead reckoning estimate is available, the approximate camera motion as described above may be a sufficient starting point for iteration.

If at decision block 1604 a motion estimate is instead taken between the two images as a form of dead reckoning, the motion estimate may constrain the search for putative correspondences and provides an estimate of camera motion at state 1606. The motion estimate may be first transformed from the robot coordinate frame to the camera coordinate frame using the known extrinsic camera parameters. Then each feature in frame A may be projected to its estimated epipolar line in the frame B, using the estimated camera motion. Only the features near the epipolar line, with locations consistent with positive depths, may need to be considered as potential correspondences to the feature in frame A. The nearest feature in descriptor space that also satisfies this epipolar constraint is taken as the putative correspondence.

At this point the system will have reached state 1612 and will iteratively seek the best matching feature as follows:

1. 1612: An error threshold factor $\tilde{r}$ is chosen as a multiple of the desired final acceptance threshold r.

2. 1614: All putative correspondences within a threshold distance of the epipolar line given by the current motion estimate, and with positive depth, are labeled as inliers. The threshold distance for a feature with scale s is given by $\tilde{r} \cdot s$, to accommodate larger location uncertainty associated with larger-scale features. s is the scale characteristic of the feature. For a feature detector that detects features at different scales such as the Difference of Gaussians detector used in SIFT, the feature has a scale which describes how much of the image it covers. Generally, larger scale features may have larger location uncertainty.

3. 1616: The motion estimate is refined by nonlinear maximum likelihood estimation over the current set of inlier correspondences.

4. 1618: If fewer inliers than a threshold are found, the process signals failure.

5. 1620: If $\tilde{r}$ has reached the target threshold r, iteration has completed successfully.

6. 1622: The threshold factor $\tilde{r}$ is decreased multiplicatively, and the process is repeated from step 2 until $\tilde{r} \approx r$.

This method may be employed in place of a standard M-estimator scheme (iterated reweighted least squares) in order to reduce the computational cost. If the computation budget permits, the M-estimator approach can be used instead, with the Tukey weighting function. In such a case, those correspondences with non-zero weight at convergence may be taken as inliers.

The system will ultimately return inliers and camera motion at state 1624 as components to form a landmark or return failure at state 1626 before ending.

Structure Estimation

Figure 10:
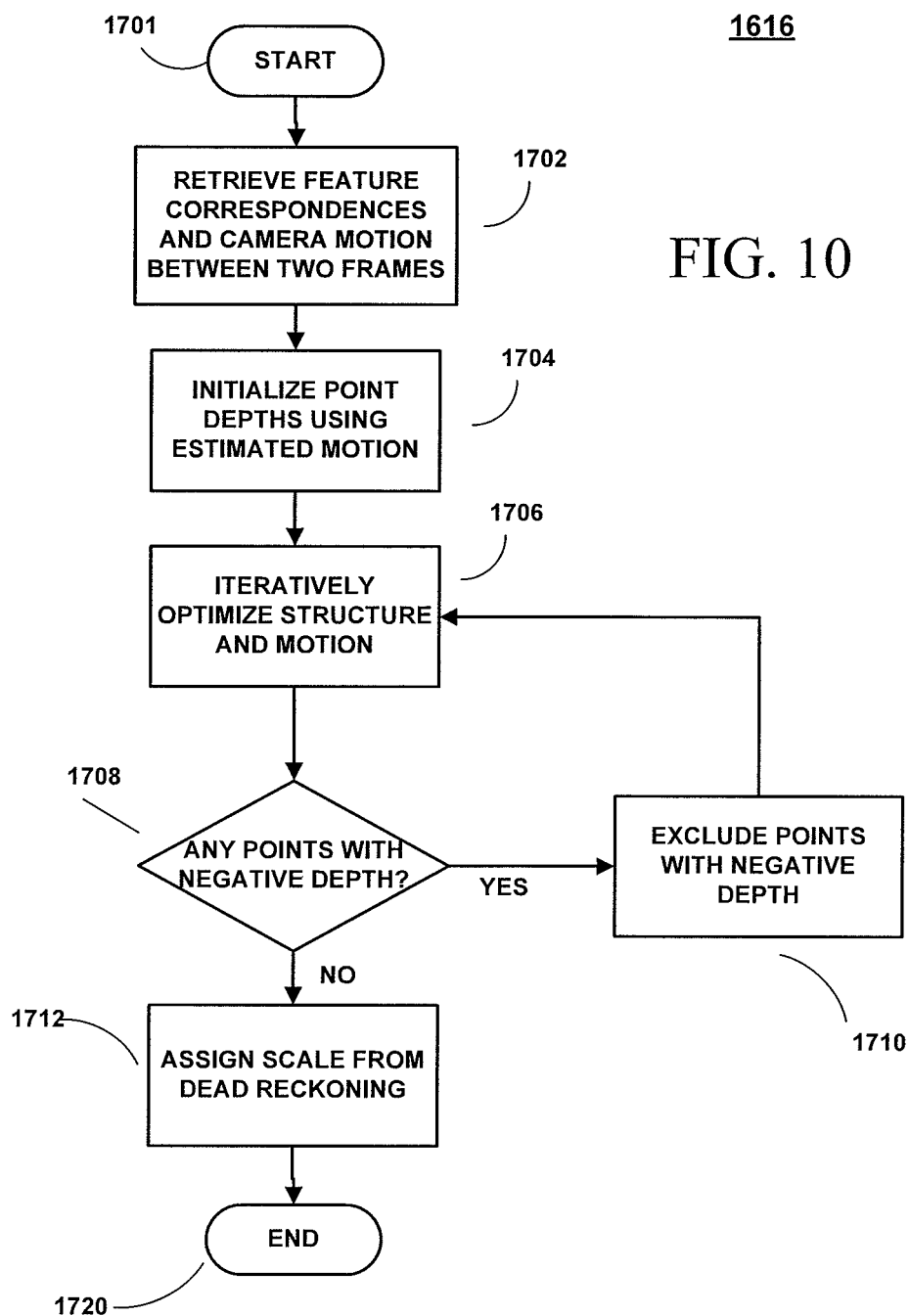
FIG. 10 is a flowchart elaborating on process 1616 of FIG. 9, i.e. upon the process for estimating 3-dimensional structure and camera motion for landmark creation.

FIG. 10 is a flowchart elaborating on process 1616 of FIG. 9, i.e. upon the process for estimating 3-dimensional structure and camera motion for landmark creation. The process begins 1701 at state 1702 when the feature correspondences and camera motion input from robust inter-frame matching are retrieved as input. At state 1704, each feature is assigned a depth along its ray in Frame A by triangulation using the estimated camera motion. The depth may parameterized in several ways, though an inverse depth parameterization is advantageous for preserving linearity.

The system may then proceed to state 1706 and iteratively optimize the structures and motion by performing a bundle adjustment. The bundle adjustment may be performed over the reprojection objective function to yield joint estimates on structure and camera motion. The scale may be left unconstrained by the feature correspondences, so the optimization is performed over a fixed-scale displacement (the camera translation is constrained to be a unit vector). Typically only two or three iterations of a standard optimization technique are necessary before the parameters converge to their maximum likelihood values.

After bundle adjustment, the structure estimates are checked at decision block 1708 for any features that triangulate to negative depths. If such features exist, they are removed from the landmark at 1710, and bundle adjustment is repeated. When there are no more points with negative depth, the system proceeds to state 1712 and assigns a scale to the landmark based on the dead reckoning odometry between the two views used for estimation before ending.

Statistical Conditioning Criterion

In certain embodiments, the covariance over camera motion may be computed during bundle adjustment (state 1706 in FIG. 10) and examined to evaluate the conditioning of the estimation. In particular, the uncertainty orthogonal to the direction of motion may be extracted and compared to a predefined threshold. If the uncertainty is above the predefined threshold, the landmark creation may be aborted. This check may strengthen the threshold on the resolved features of state 1016 in FIG. 6.

SLAM Back End Processing

Figure 11:
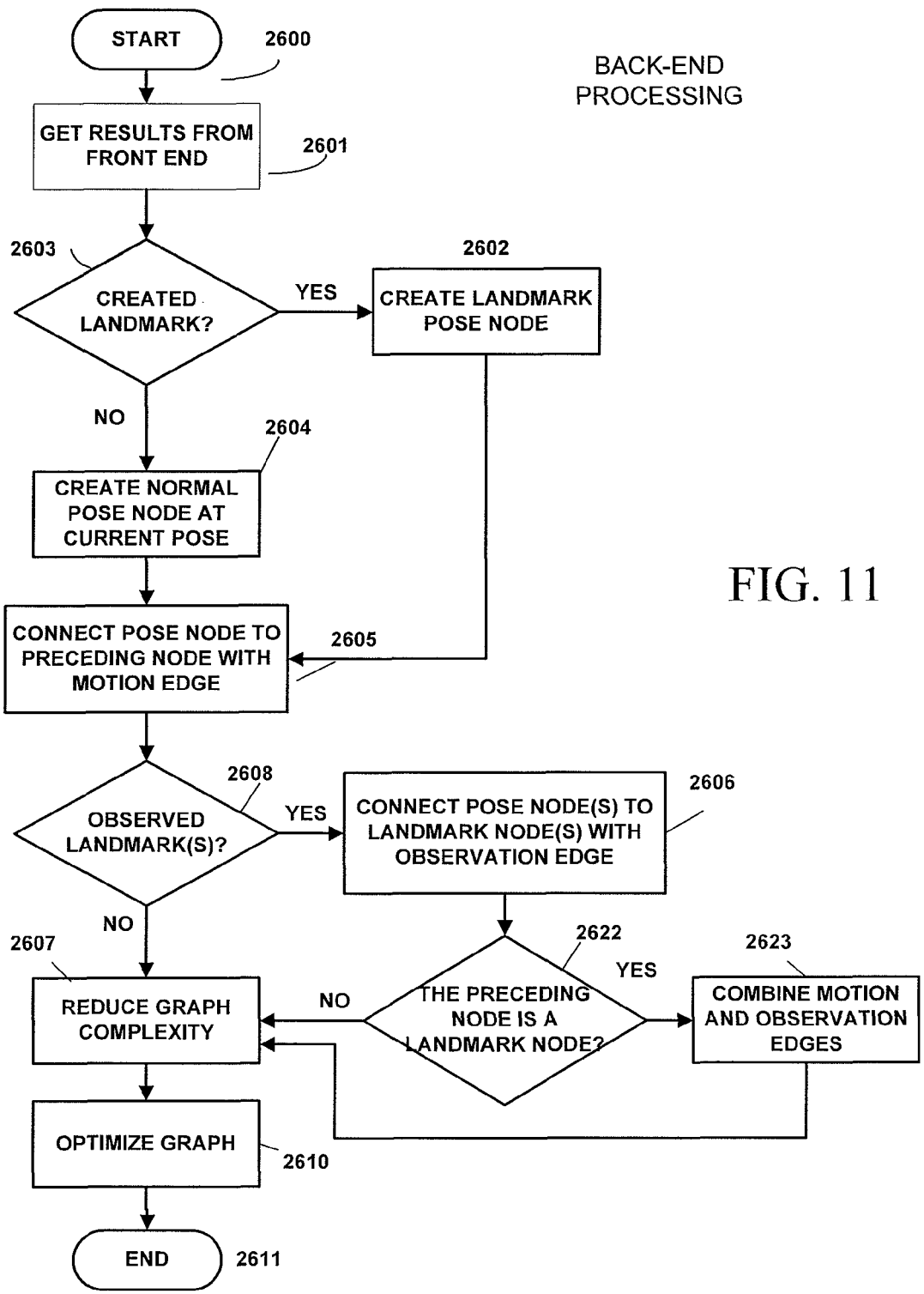
FIG. 11 is a flowchart illustrating an overview of the back-end processing described in certain embodiments.

FIG. 11 is a flowchart illustrating an overview of the back-end processing described in certain embodiments. Particularly, FIG. 11 illustrates the general process flow by which the SLAM Back End stores the map in a graphical mode and estimates the robot poses stored in the graph. The process begins at state 2601 by receiving results form the front end. The system then proceeds to decision block 2603 and determines whether a normal pose node is to be created at state 2604 or whether a landmark node is to be created. The system then connects the generated pose node to the preceding nodes with a motion edge at 2605. A motion edge is defined as an edge where the transformation information is obtained from a dead reckoning type of sensor.

At this point, the system may then determine if landmarks are observed 2608. If landmarks are not observed, the system may proceed directly to state 2607 and reduce graph complexity. Once the complexity has been reduced the system may then proceed to state 2601 and optimize the graph before ending.

If landmarks were instead observed at decision block 2608, the system may first connect the pose nodes to landmark nodes with observation edges at state 2606. An observation edge is defined as an edge where the transformation information is obtained from the observation of a landmark. Then, at decision block 2622, the system and determines if the preceding node is a landmark node. If the node is a landmark node, the system proceeds to state 2623 and combines the motion and observation edges are combined 2623. Adding landmarks 2602 and adding observations 2606 and graph optimization 2610 are described in greater detail below. The system may then proceed to states 2607 and 2610 and reduce graph complexity and optimize the graph as before.

New Landmark Processing

Figure 12:
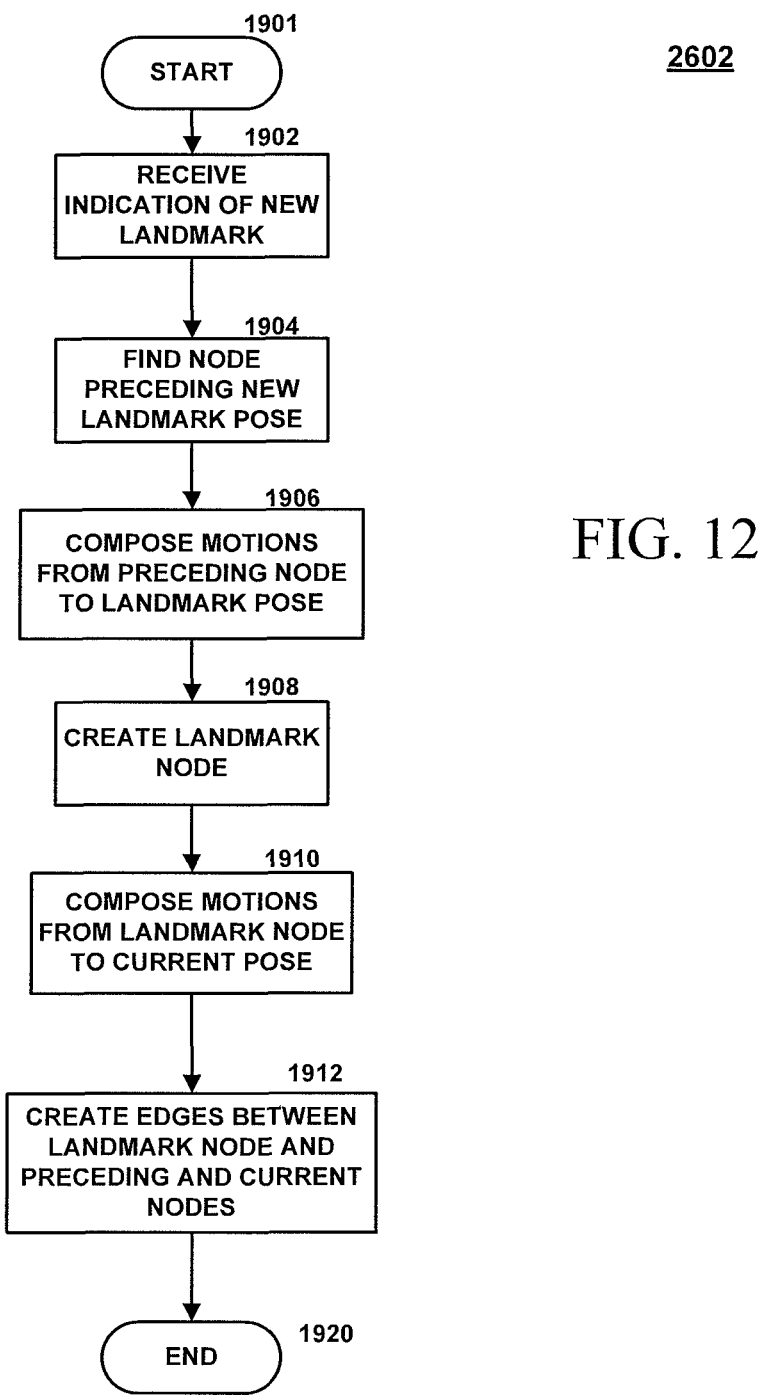
FIG. 12 is a flowchart elaborating on state 2602 of the flowchart of FIG. 11, i.e. illustrating a process for integrating a landmark into a graph back-end.

FIG. 12 is a flowchart elaborating on state 2602 of the flowchart of FIG. 11, i.e. illustrating a process for integrating a landmark into a graph back-end. The process begins by receiving an indication of a new landmark at state 1902. At state 1904 the system then determines the node preceding the new landmark pose. Incremental motion estimates between that node and the pose of the new landmark are then composed in state 1906. The new landmark node is then created at state 1908, and initialized with a pose consistent with the composed motions and the preceding node. All motion estimates between the landmark node and the current node may then be composed in 1910. Finally, graph edges are created between the new landmark node and preceding and successor nodes using the composed motion estimates at state 1912.

Landmark Recognition Processing

Figure 13:
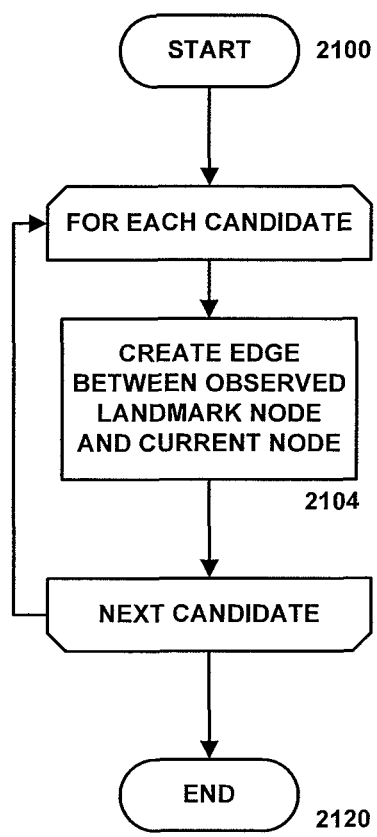
FIG. 13 is a flowchart elaborating on state 2606 of the flowchart of FIG. 11, i.e. illustrating a process for integrating observations into a SLAM graph.

When the process of FIG. 8 yields a set of observations, the observations may be added to the SLAM graph as edges. FIG. 13 is a flowchart elaborating on state 2606 of the flowchart of FIG. 11, i.e. illustrating a process for integrating observations into a SLAM graph. Particularly, when the system receives a set of observations, a pose node may be created in the graph for the current pose. Then an edge is created in the graph for each observation, connecting the landmark node associated with the observed landmark to the newly-created pose node at state 2104. The transformation estimate encoded by each edge consists of the corresponding observation's mean and covariance as described in FIG. 8.

SLAM Graph Reduction Overview

Generally, the SLAM graph grows every time a landmark is created or observed and new nodes and edges are added to the graph. This is true even if the robot stays within a bounded space. If the landmarks occupying that space are observed repeatedly and continuously the graph will continue to grow and complexity will increase with time. Since the storage requirements and graph optimization costs grow with the graph complexity, in order to bound these costs, certain embodiments contemplate a method for bounding the graph complexity.

In some embodiments, the spatial density of landmark nodes may be automatically bounded by the visual front end (as existing landmarks will be recognized within a certain radius of poses), so that operation within a fixed spatial region implies a bounded number of landmark nodes. The pose nodes, on the other hand, represent past robot poses that are not directly useful in subsequent operation, except as a data structure for encoding constraints on other nodes. The number of pose nodes grows with the number of observations, instead of with the number of landmarks. The graph complexity can be bounded by removing pose nodes and selected edges to keep the complexity of the graph linear in the number of landmarks and thus linear in the amount of space explored.

Figure 14:
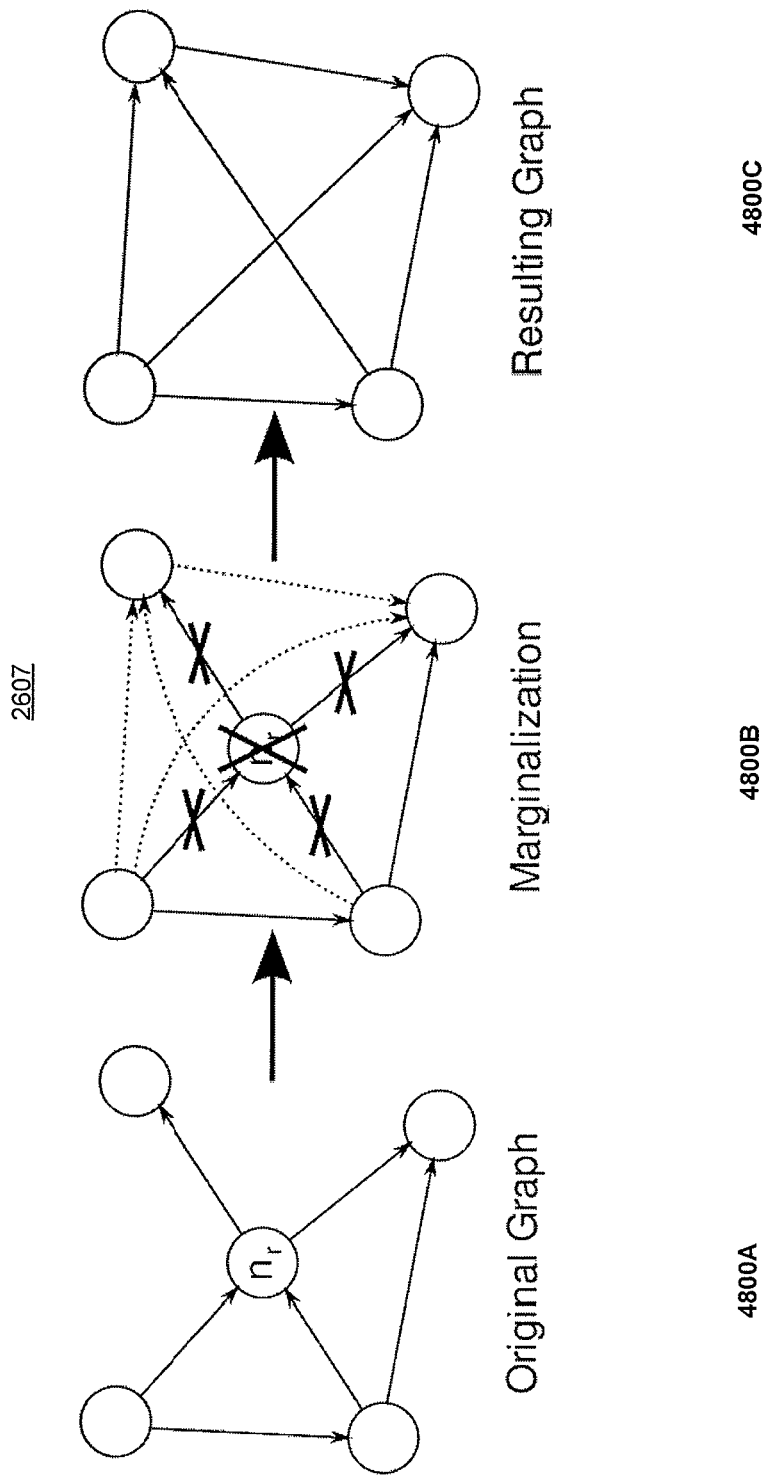
FIG. 14 illustrates the changing structure of a SLAM graph following certain of the operations described in FIGS. 15-17.

FIG. 14 illustrates an example of the marginalization and reduction procedure. Graph 4800A represents an original graph comprising node $n_r$ selected for removal. As indicated in graph 4800B, the node $n_r$ and all its incident edges are marked for deletion as part of the marginalization process. New edges indicated by the dashed lines are introduced and the information from the edges marked for deletion is transferred to the new and previously existing edges connecting the nodes remaining. At graph 4800C, the central node has been removed together with its incident edges and the system reconstitutes the graph by introducing new edges to account for those deleted as part of the removal process.

Graph Reduction

Figure 15:
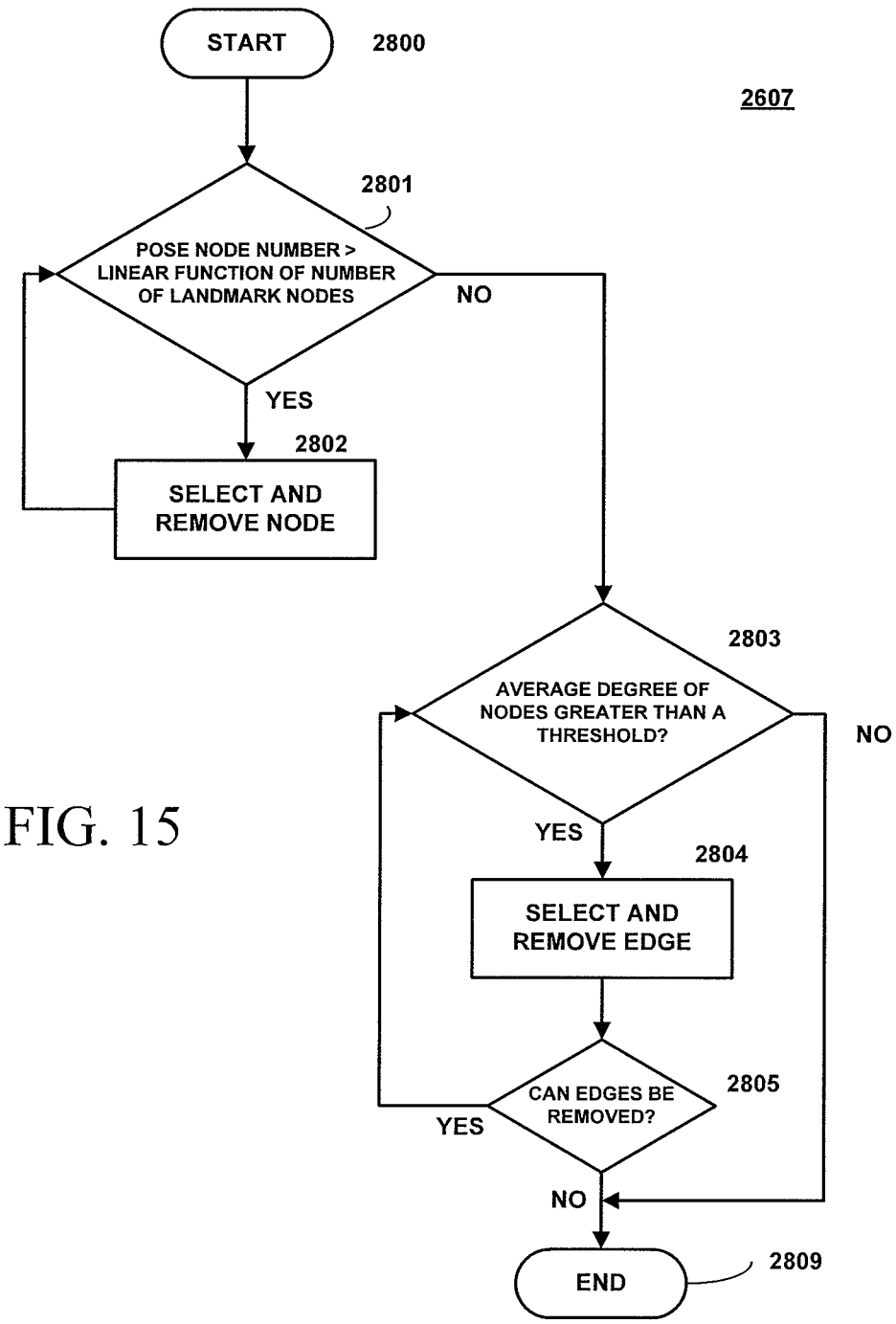
FIG. 15 is a flowchart elaborating on state 2607 of the flowchart of FIG. 11, i.e. reduction of the SLAM graph complexity.

FIG. 15 illustrates an overview of the graph complexity reduction. First, the number of pose nodes is bounded to a linear function of the number of landmark nodes (2801, 2802). The details of selecting and remove a node is given in FIG. 16. Then the average degree of nodes is bounded (2803, 2804, 2805). The details of selecting and removing edges is given in FIG. 18.

Generally the process in FIG. 15 comprises three stages. First, a node is identified for removal and removed (2801, 2802), second edges are added to retain information previously represented by the edges incident into the removed node (not shown), and finally, the edges over the entire graph are pruned to remove those which are excessive (2803, 2804, 2805), including those which may have been generated in the second stage. Each of these three stages are described in greater detail below.

Graph Reduction—Pose Node Marginalization

As the graph represents a Gaussian Markov Random Field (GMRF) over past poses of the robot, pose nodes can be removed in statistically consistent manner by marginalizing out the corresponding poses from the GMRF state. The graph directly encodes the Markov property of the system: a node is conditionally independent of all nodes to which it is not directly connected. Thus marginalizing out a node's state involves only the Markov blanket of the node (all of the nodes within one hop, i.e. an incident edge, in the graph). Further, because the marginal distributions of a Gaussian are also Gaussian, the graph resulting from the removal exactly encodes the correct Gaussian distribution over the remaining variables.

Figure 16:
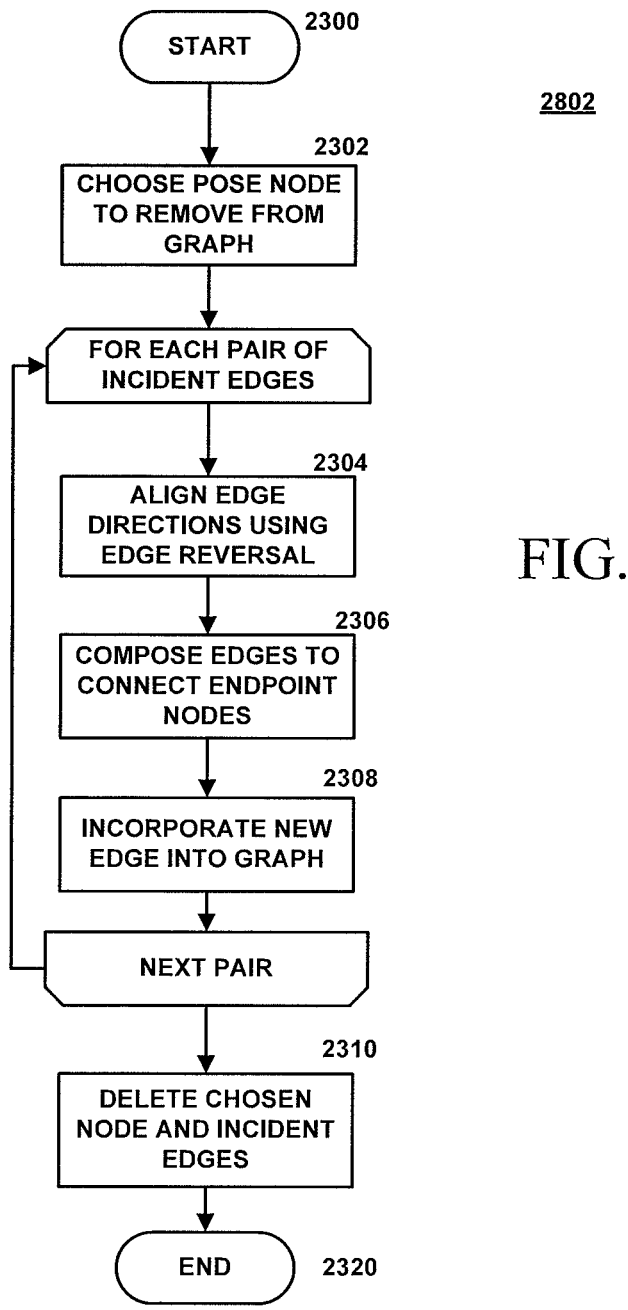
FIG. 16 is a flowchart elaborating on state 2802 of the flowchart of FIG. 15, i.e. node selection and removal.
Figure 17:
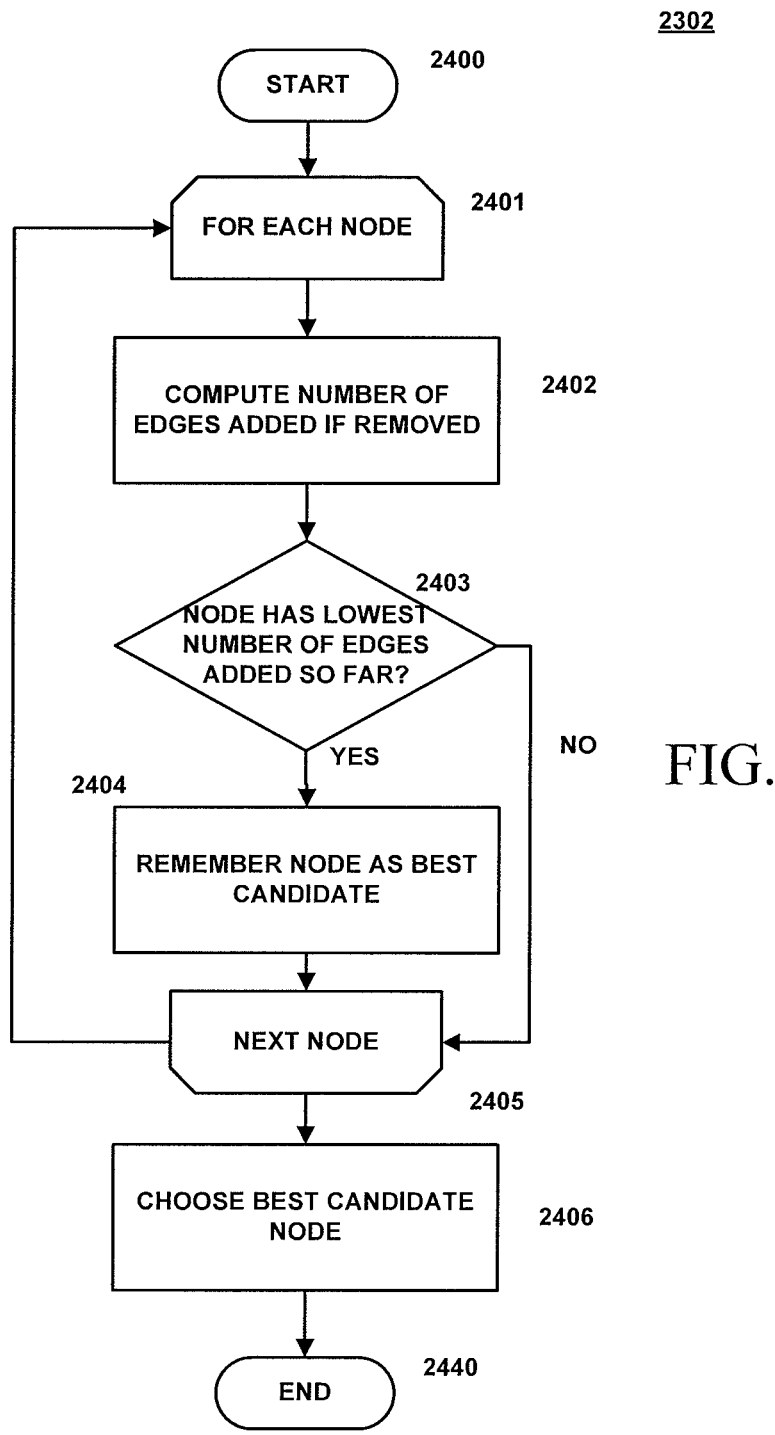
FIG. 17 is a flowchart elaborating on state 2302 of the flowchart of FIG. 16, i.e. choosing a pose node to remove from the SLAM graph.

FIG. 16 is a flowchart elaborating on state 2802 of the flowchart of FIG. 15, i.e. node selection and removal. Particularly, FIG. 16 illustrates the pose node marginalization procedure for decreasing the number of nodes in the SLAM graph. Generally speaking, the process begins at state 2302 when the system selects a pose node to remove from the graph. The system may then iterate through each of the pairs of incident edges to the node. For each pair of incident edges, in state 2304 the system may align edge directions using edge reversal. Then, in state 2306, the system may compose edges to connect endpoint nodes. At state 2308 the system may then incorporate a new edge into the graph. After all the pairs of incident edges have been considered, the system may delete the chosen node and incident edges in state 2310.

Removing a node by marginalization induces pairwise constraints between all pairs of nodes connected to the removed node. If a constraint (edge) already exists between such a pair, the new constraint is combined with the existing constraint by multiplication of their Gaussians. A few operations on edges are needed to define the node marginalization procedure:

Edge Reversal

An edge e represents an uncertain rigid transformation between its two endpoint nodes, given by a mean and covariance $(\mu, \Sigma)$ in the appropriate Lie group and Lie algebra respectively. The adjoint operator in a Lie group allows elements of the Lie algebra to be moved from the right tangent space of a transformation to the left. Thus the reversed edge $e^{-1}$, pointing in the opposite direction in the graph but encoding the same transformation constraint, is given by $$e^{-1}=(\mu^{-1},\text{Adj}[\mu^{-1}]\cdot\Sigma\cdot\text{Adj}[\mu^{-1}]^T) \quad \text{Equation 1}$$

Edge Composition

Given an edge $e_0=(\mu_0, \Sigma_0)$ from node a to node b and an edge $e_1=(\mu_1, \Sigma_1)$ from node b to node c, the two edges may be composed into one edge from a to c by composing the uncertain transformations, as in a Kalman filter motion update:

$$e_1\cdot e_0=(\mu_1\cdot\mu_0,\Sigma_1+\text{Adj}[\mu_1]\cdot\Sigma_0\cdot\text{Adj}[\mu_1]^T) \quad \text{Equation 2}$$

Edge Combination

Given two edges $e_0=(\mu_0,\Sigma_0)$ and $e_1=(\mu_1,\Sigma_1)$ connecting the same two nodes in the same direction, their constraints may be combined by multiplying the associated Gaussian distributions together to yield the resulting Gaussian. Because the exponential map from the tangent space to the transformation manifold (from the Lie algebra to the Lie group) is nonlinear, the combination procedure for the mean is iterative. The combined covariance $\Sigma_c$ is computed by adding the information matrices of the two edges:

$$\Sigma_C=(\Sigma_0^{-1}+\Sigma_1^{-1})^{-1} \quad \text{Equation 3}$$

Let the initial estimate of the combined mean be the first edge's mean:

$$\mu_C^0=\mu_0 \quad \text{Equation 4}$$

Then the combined transformation is updated by taking the information-weighted average between the two transformations and exponentiating the correction into the Lie group:

$$v_j^i=\mu_C^i\cdot\mu_j \quad \text{Equation 5}$$

$$\delta\mu=\Sigma_C\cdot\Sigma(\Sigma_j^{-1}\cdot v_j^i) \quad \text{Equation 6}$$

$$\mu_C^{i+1}=\exp(\delta\mu)\cdot\mu_C^i \quad \text{Equation 7}$$

This update is iterated until convergence (usually three or four iterations), yielding after k iterations the combined edge:

$$e_C=(\mu_C^k,\Sigma_C) \quad \text{Equation 8}$$

Consider a node $n_r$ to be removed by marginalization 2302, with incident edges $E_r=\{e_0, \ldots, e_m\}$. Each pair of such edges $(e_i, e_j)$ is composed (2304):

$$e_{(i,j)} = \begin{cases} e_i \cdot e_j & s(e_i) = d(e_j) = n_r \\ e_i \cdot e_j^{-1} & s(e_i) = s(e_j) = n_r \\ e_i^{-1} \cdot e_j & d(e_i) = d(e_j) = n_r \\ e_j \cdot e_i & d(e_i) = s(e_j) = n_r \end{cases} \quad \text{Equation 9}$$

The resulting composed edge (2306) is added to the graph between the two incident nodes that are not $n_r$. If such an edge already exists, the edges are combined (the new composed edge may need to be reversed before combining it with the existing edge) (2308).

Finally, all incident edges $E_r$ are deleted from the graph along with the node $n_r$ (2310). Returning to FIG. 16, Because the goal of graph reduction is to limit the cardinality of the graph nodes and edges, pose nodes are chosen for marginalization according to how many edges will be created by their removal at state 2302. This number can be determined by subtracting the degree of the node (defined by the number of incident edges) from the number of unconnected pairs in the Markov blanket of the node. The node that will incur the smallest increase in the number of graph edges is marginalized out. For nodes whose Markov blanket is already well-connected, this increase is often negative, and the total number of graph edges is decreased. This process is described in FIG. 17, which is a flowchart elaborating on state 2302 of the flowchart of FIG. 16, i.e. choosing a pose node to remove from the SLAM graph. In 2401 an iteration over all the existing pose nodes is established. For each pose node, in 2402 the number of edges added to the graph by the removal of that node is computed. During the iteration, in 2403 and 2404 the best current candidate node for removal is stored. The best candidate is the one who's removal will cause the smallest increase in the number of edges. At the end of the iteration, the best overall candidate is selected in 2406.

Edge Removal

While the node marginalization procedure always decreases the number of graph nodes by one and attempts to decrease the number of edges as much as possible, it might fail to bound the degrees of nodes. Marginalizing out all pose nodes results in a completely-connected graph over landmark nodes, which has edge cardinality quadratic in the number of landmarks.

To limit the edge complexity of the graph, edges can be heuristically pruned during operation. Removing an edge from the graph is equivalent to discarding the information represented by the edge, as though the observation or measurement had never been made.

One embodiment of an edge pruning procedure keeps a list of nodes with degree above a fixed, pre-determined bound. The list needs to be modified only when edges are added to graph, which occurs during landmark observations or node removal events. Then edges are removed from each node in the list until no node degrees exceed the bound.

Figure 18:
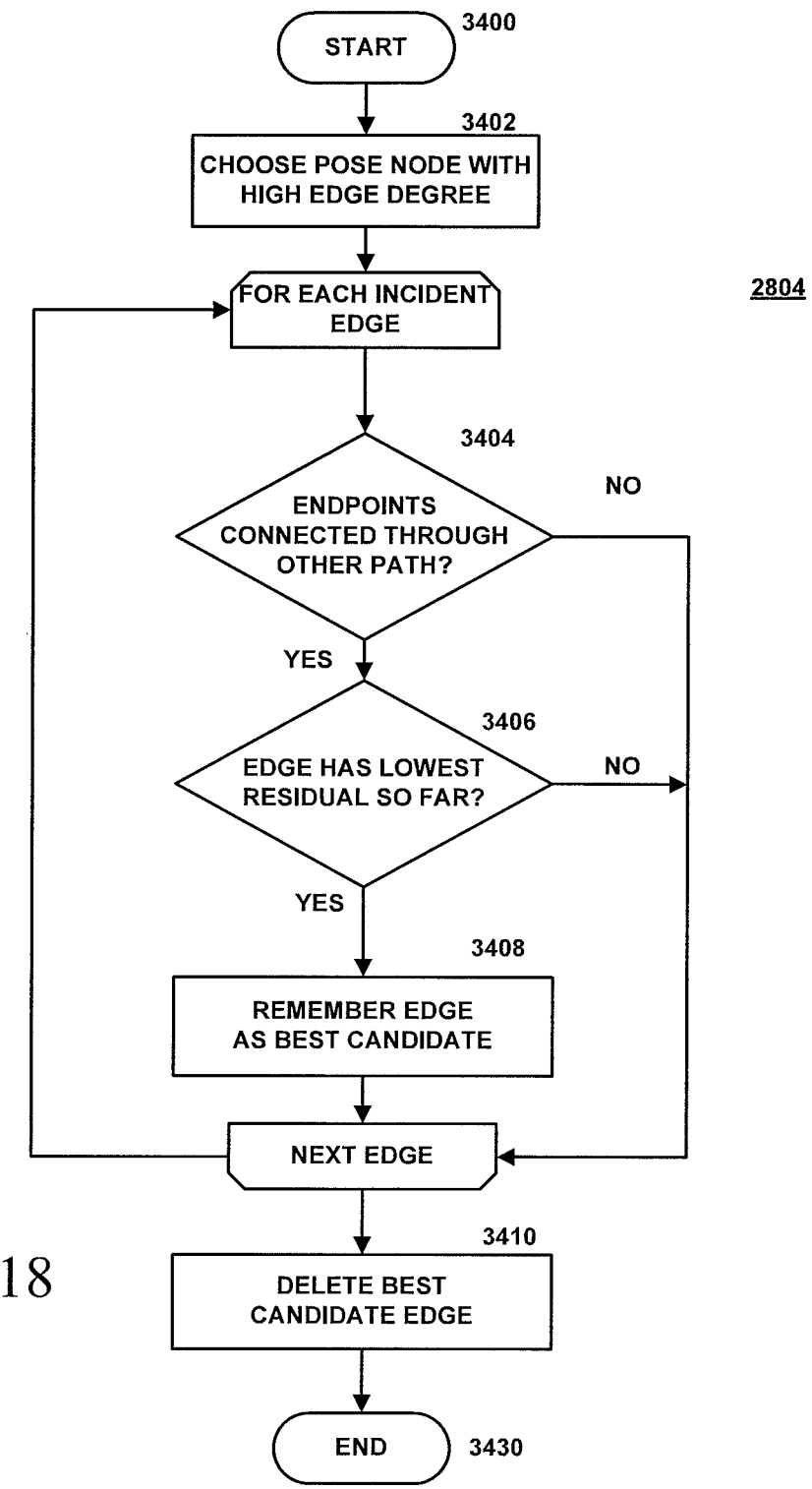
FIG. 18 is a flowchart elaborating on state 2804 of the flowchart of FIG. 15, i.e. edge selection and removal.

FIG. 18 is a flowchart elaborating on state 2804 of the flowchart of FIG. 15, i.e. edge selection and removal. The process may begin at state 3402 where the pose node in the SLAM graph or a portion thereof having the highest edge degree (i.e., the largest number of incident edges) is selected. For each of these incident edges the process may then perform a plurality of operations to identify which of the incident edges is the best candidate for removal. At state 3404 the system determines whether removing the edge would disconnect the graph. Edges are only considered for removal if removing would not split the graph into two unconnected components. At state 3406 the process determines if the edge under consideration has the lowest residual considered so far. The residual of the edge here refers the residual from the optimization process. This indicates how well the constraint imposed by that edge fits the current solution (or how well the current solution fits the edge). Based on the residual an edge which is in least disagreement with the current state of the graph, and whose removal is therefore likely to affect the graph optimum least, may be identified. If the conditions of either state 3404 or 3406 are not satisfied, the system iterates to the next edge. Otherwise, the edge is recorded as being the best candidate at state 3408. Once the process is complete, the best candidate edge is deleted at state 3410.

Graph Optimization

Figure 19:
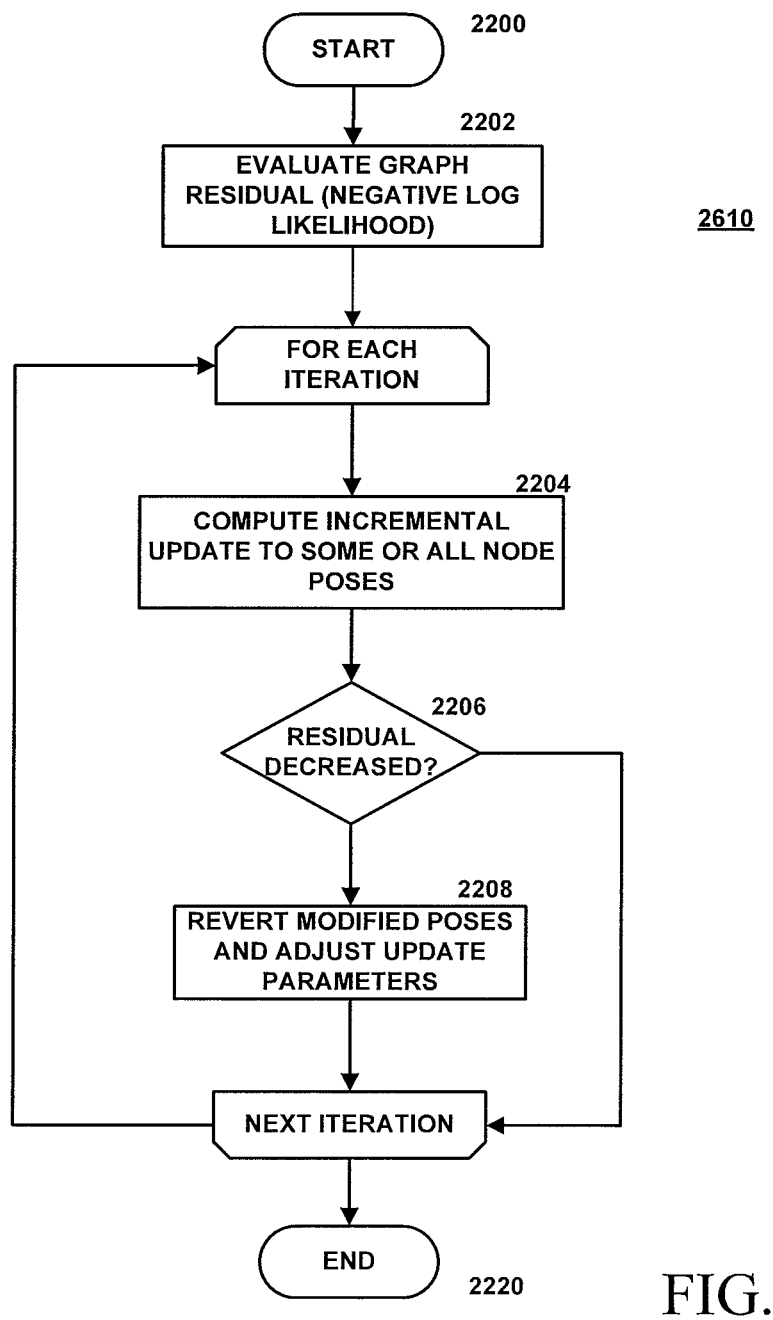
FIG. 19 is a flowchart elaborating on state 2610 of the flowchart of FIG. 11, i.e. one method for graph optimization.

FIG. 19 is a flowchart elaborating on state 2610 of the flowchart of FIG. 11, i.e. one method for graph optimization. The SLAM graph flexibly represents the GMRF corresponding to the SLAM estimation problem. The process begins at state 2202 by computing the negative log-likelihood of the parameter estimates (encoded by the nodes). This value may be computed by summing over the residuals of the edges as described in the following manner.

Graph Negative Log Likelihood Computation

Let the edge set be given by $E=\{e_i\}$. For an edge $e$, let the source and destination node poses be given by $s(e)$ and $d(e)$ respectively. Let the edge's constraint mean be denoted by $\mu(e)$ and the covariance by $\Sigma(e)$. Then the negative log-likelihood $-L$ of the graph (up to a constant offset) is given in terms of the residuals $v_i$ by $$v_i = \mu(e_i) \cdot s(e_i) \cdot d(e_i)^{-1} \qquad \text{Equation 10}$$

$$-L = \sum_i v_i^T \left(\sum (e_i)^{-1}\right) v_i \qquad \text{Equation 11}$$

When the node pose estimates better satisfy the constraints encoded in the edges, the negative log-likelihood $-L$ is lower. Graph optimization increases the likelihood of the GMRF parameters by minimizing the negative log-likelihood as a function of the node parameters.

The system may then iteratively seek the optimization producing a reduced residual in states 2204, 2206, and 2208. After each such update, the residual (or its change) may be computed at state 2204, and if the residual has not decreased at decision block 2206 the node updates may reverted and the update heuristics adjusted at state 2208. The repeated application of such incremental pose adjustments, in tandem with residual checking, minimizes the error in the graph, thus maximizing the likelihood of all landmark observations and motion estimates. Examples of suitable graph optimization embodiments for state 2204 include conjugate gradients, stochastic relaxation, Gauss-Seidel relaxation, Cholesky decomposition, rigid subgraph adjustment, multi-level relaxation, or any of a variety of other established methods. Furthermore, one will readily recognize that any general method for incremental nonlinear optimization may be applied successfully to the graph.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g. a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

What is claimed is:

1. A method for localization and mapping in a system comprising a processor and a camera, wherein the processor is configured to generate a graph with a plurality of pose nodes, a plurality of landmark nodes, and a plurality of edges, wherein:
   (i) a pose node comprises a pose of a robot;
   (ii) a landmark node comprises a pose of the robot, a landmark identifier corresponding to one or more objects, and an estimate of the location of each of the one or more objects; and
   (iii) at least one of the plurality of edges comprises a rigid transformation relating position and orientation of the robot at two locations;
   the method comprising:
   updating the graph if the number of pose nodes in the graph exceeds a first threshold, comprising:
     i) identifying a pose node directly linked to associated Markov blanket nodes with two or more incident edges;
     ii) composing said incident edges to generate one or more new edges between pairs of said associated Markov blanket nodes; and
     iii) removing the identified pose node and said two or more incident edges;
   removing at least one edge of said plurality of edges present in the graph if the total number of edges in the graph exceeds a second threshold; and
   updating an estimate of a location of the remaining pose nodes based at least in part on the plurality of edges present in the graph.

2. The method of claim 1, wherein identifying a pose node comprises:
   i) for each pose node in the graph, determining a total number of edges that would be present in the graph if the pose node was removed and incident edges composed to generate one or more new edges between pairs of Markov blanket nodes; and
   ii) selecting the pose node that would result in the least total number of edges if removed from the graph.

3. The method of claim 1, wherein composing said incident edges comprises:
   i) generating an estimate of a relative pose between a pair of Markov blanket nodes, the relative pose estimate being based in part on a vector sum of relative pose measurements associated with two or more incident edges; and
   ii) generating a covariance estimate based on covariance estimates associated with the two or more incident edges.

4. The method of claim 1, wherein removing at least one edge of said plurality of edges present in the graph comprises:
   i) generating a residual value for each edge in the graph, the residual value being based at least in part on the difference between the relative pose of the nodes connected by the edge in the graph and the relative pose given by the transformation value associated with the same edge;
   ii) identifying the edge with lowest residual value; and
   iii) removing the identified edge from the graph.

5. The method of claim 1, wherein the system is a mobile robot further comprising a navigation system and a path planner, the method further comprising:
   i) generating a set of robot move commands to traverse a trajectory; and
   ii) after updating the estimate of the location of the pose nodes present in the graph, updating the set of move commands for navigating the robot based at least in part on the trajectory and updated estimate of the location of the pose nodes present in the graph and a plurality of landmark pose nodes.

6. The method of claim 5, further comprising:
   capturing at least one image while traversing the trajectory;
   determining whether the one or more images depict a known landmark or a new landmark;
   updating the graph, wherein updating the graph comprises:
     i) generating a new pose node if the at least one image depicts a known landmark
     ii) generating a new landmark pose node if the at least one image depicts a new landmark; and
     iii) generating at least one new edge associating the new pose node or new landmark pose node with one or more existing nodes in the graph.

7. The method of claim 6, further comprising extracting a plurality of features, each feature comprising a scale-invariant feature transform (SIFT) feature.

8. The method of claim 1, wherein composing said incident edges to generate one or more new edges between pairs of said associated Markov blanket nodes further comprises:
   i) combining at least one of said new edges with an existing edge by generating a weighted average of a mean of the new edge and a mean of the existing edge, and generating a new covariance estimate based on the sum of the inverse of the covariance estimate of the new edge and the covariance estimate of the existing edge.

9. A mobile electronic device comprising:
   a camera configured to capture an image;
   at least one processor for executing sets of instructions;
   memory containing a navigation application;
   wherein execution of the navigation application by at least one processor directs the processor to:
   maintain a graph comprising a plurality of pose nodes, a plurality of landmark nodes, and edges,
   wherein:
   (i) a pose node comprises a pose of a robot;
   (ii) a landmark node comprises a pose of the robot, a landmark identifier corresponding to one or more objects, and an estimate of the location of each of the one or more objects; and
   (iii) an edge comprises a rigid transformation relating position and orientation of the robot at two locations;
     update the graph if the number of pose nodes in the graph exceeds a first threshold, comprising:
       i) identifying a pose node directly linked to associated Markov blanket nodes with two or more incident edges;
       ii) composing said incident edges to generate one or more new edges between pairs of said associated Markov blanket nodes; and
       iii) removing the identified pose node and said two or more incident edges;

remove at least one edge of said plurality of edges present in the graph if the total number of edges in the graph exceeds a second threshold; and update an estimate of a location of each of the remaining pose nodes based at least in part on the plurality of edges present in the graph.

10. The mobile electronic device of claim 9, wherein identifying a pose node comprises:
   i) for each pose node in the graph, determining a total number of edges that would be present in the graph if the pose node was removed and incident edges composed to generate one or more new edges between pairs of blanket nodes; and
   ii) selecting the pose node that would result in the least total number of edges if removed from the graph.

11. The mobile electronic device of claim 9, wherein composing said incident edges comprises:
   i) generating an estimate of a relative pose between a pair of blanket nodes, the relative pose estimate being a vector sum of relative pose measurements associated with two or more incident edges; and
   ii) generating a covariance estimate based on covariance estimates associated with the two or more incident edges.

12. The mobile electronic device of claim 9, wherein removing at least one edge of said plurality of edges present in the graph comprises:
   i) generating a residual value for each edge in the graph, the residual value being based at least in part on the difference between the relative pose of the nodes connected by the edge in the updated graph and the relative pose given by the mean of the same edge;
   ii) identifying the edge with lowest residual value; and
   iii) removing the identified edge from the graph.

13. The mobile electronic device of claim 12, wherein the mobile electronic device is a mobile robot further comprising a path planner, the planner further configured to:
   i) generate a set of robot move commands to traverse a trajectory; and
   ii) after updating the estimate of the location of the remaining pose nodes, updating the set of move commands for navigating the robot based at least in part on the trajectory and updated estimate of the location of the remaining pose nodes.

14. The mobile electronic device of claim 13, wherein execution of the navigation application by at least one processor further directs the processor to:
   capture at least one image while traversing the trajectory;
   determine whether the one or more images depict a known landmark or a new landmark;
   update the graph by:
      i) generating a new pose node if the at least one image depicts a known landmark;
      ii) generating a new landmark node if the at least one image depicts a new landmark; and
      iii) generating at least one new edge associating the new pose node or new landmark node with one or more existing nodes in the graph.

15. The mobile electronic device of claim 14, wherein execution of the navigation application by at least one processor further directs the processor to extract a plurality of features, each feature comprising a scale-invariant feature transform (SIFT) feature.

16. The mobile electronic device of claim 9, wherein composing said incident edges to generate one or more new edges between pairs of said associated blanket nodes further comprises:

i) combining at least one of said new edges with an existing edge by averaging the estimate of a relative pose of the new edge and existing edge, and averaging the covariance estimate of the new edge and existing edge.

17. A method for localization and mapping in a system comprising a processor and a camera, wherein the processor is configured to generate a graph with a plurality of pose nodes and a plurality of edges, the method comprising:
   updating the graph if the number of pose nodes in the graph exceeds a first threshold, comprising:
      i) identifying a pose node directly linked to associated Markov blanket nodes with two or more incident edges;
      ii) composing said incident edges to generate one or more new edges between pairs of said associated Markov blanket nodes; and
      iii) removing the identified pose node and said two or more incident edges;
   removing at least one edge of said plurality of edges present in the graph if the total number of edges in the graph exceeds a second threshold, comprising:
      (i) generating a residual value for each edge in the graph, the residual value being based at least in part on the difference between the relative pose of the nodes connected by the edge in the graph and the relative pose given by the transformation value associated with the same edge;
      (ii) identifying the edge with lowest residual value; and
      (iii) removing the identified edge from the graph;
   updating an estimate of a location of the remaining pose nodes based at least in part on the plurality of edges present in the graph.

18. A mobile electronic device comprising:
   a camera configured to capture an image;
   at least one processor for executing sets of instructions;
   memory containing a navigation application;
   wherein execution of the navigation application by at least one processor directs the processor to:
   maintain a graph comprising a plurality of pose nodes and edges;
   update the graph if the number of pose nodes in the graph exceeds a first threshold, comprising:
      i) identifying a pose node directly linked to associated Markov blanket nodes with two or more incident edges;
      ii) composing said incident edges to generate one or more new edges between pairs of said associated Markov blanket nodes; and
      iii) removing the identified pose node and said two or more incident edges;
   remove at least one edge of said plurality of edges present in the graph if the total number of edges in the graph exceeds a second threshold, comprising:
      (i) generating a residual value for each edge in the graph, the residual value being based at least in part on the difference between the relative pose of the nodes connected by the edge in the updated graph and the relative pose given by the mean of the same edge;
      (ii) identifying the edge with lowest residual value; and
      (iii) removing the identified edge from the graph;
   update an estimate of a location of each of the remaining pose nodes based at least in part on the plurality of edges present in the graph.

* * * * *